United States Patent
Abeyasekera et al.

(10) Patent No.: US 10,250,042 B2
(45) Date of Patent: Apr. 2, 2019

(54) WIND-TURBINE CONVERTER CONTROL FOR MODULAR STRING CONVERTERS

(71) Applicant: VESTAS WIND SYSTEMS A/S, Aarhus N (DK)

(72) Inventors: Tusitha Abeyasekera, Aarhus N (DK); Duy Duc Doan, Tilst (DK); Lars Helle, Suldrup (DK); Søren Andersen, Tilst (DK); John Godsk Nielsen, Hornslet (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 9 days.

(21) Appl. No.: 15/521,910

(22) PCT Filed: Oct. 19, 2015

(86) PCT No.: PCT/DK2015/050322
§ 371 (c)(1),
(2) Date: Apr. 26, 2017

(87) PCT Pub. No.: WO2016/066169
PCT Pub. Date: May 6, 2016

(65) Prior Publication Data
US 2017/0331295 A1    Nov. 16, 2017

(30) Foreign Application Priority Data
Oct. 27, 2014    (DK) ................................ 2014 70652

(51) Int. Cl.
*H02M 5/45* (2006.01)
*H02J 3/38* (2006.01)
*F03D 7/04* (2006.01)
*F03D 9/25* (2016.01)
(Continued)

(52) U.S. Cl.
CPC .............. *H02J 3/386* (2013.01); *F03D 7/042* (2013.01); *F03D 9/255* (2017.02);
(Continued)

(58) Field of Classification Search
CPC .......... H02M 5/40; H02M 5/42; H02M 5/453; H02M 5/45; H02M 5/4585; H02M 3/33507; H02M 1/12
(Continued)

(56) References Cited

U.S. PATENT DOCUMENTS

2003/0202367 A1    10/2003  Schreiber
2005/0012339 A1*    1/2005  Mikhail ................ F03D 7/0224
                                                          290/44
(Continued)

FOREIGN PATENT DOCUMENTS

CN    103236800 A    8/2013
CN    104113082 A    10/2014
(Continued)

OTHER PUBLICATIONS

International Search Report for PCT/DK2015/050322, dated Feb. 2, 2016.
(Continued)

*Primary Examiner* — Adolf Berhane
(74) *Attorney, Agent, or Firm* — Patterson + Sheridan, LLP

(57) ABSTRACT

A wind turbine converter system with a rectifier and an inverter and a converter controller has at least first and second converter strings. The converter system is controlled by a master-converter controller and a slave-converter controller. The master-converter controller controls the first converter string and the slave-converter controller controls the second converter string. The master-converter controller receives commands from a superordinate wind turbine controller, provides the slave-converter controller with string-control commands on the basis of the superordinate control commands, and controls the conversion operation of the first converter string on the basis of the superordinate control command. The slave-converter controller receives the
(Continued)

string-control commands from the master-converter controller and controls the conversion operation of the second converter string on the basis of the string-control commands received. The first and the second converter strings can be arranged in a bipolar configuration giving access to a neutral point. Fault detection can be performed based on current through the neutral. The system is capable of fault ride-through. Also, in case of failure of the master-converter controller, a redundant unit takes its place.

17 Claims, 12 Drawing Sheets

(51) Int. Cl.
*H02P 101/15* (2016.01)
*H02M 1/00* (2006.01)

(52) U.S. Cl.
CPC . *H02M 2001/0003* (2013.01); *H02P 2101/15* (2015.01); *Y02E 10/723* (2013.01); *Y02E 10/763* (2013.01)

(58) Field of Classification Search
USPC ............ 363/34, 35, 37, 40, 95; 290/44
See application file for complete search history.

(56) References Cited

U.S. PATENT DOCUMENTS

| | | | | |
|---|---|---|---|---|
| 2009/0187282 A1* | 7/2009 | Menke | ............... | F03D 7/0224 700/287 |
| 2009/0322083 A1 | 12/2009 | Wagoner et al. | | |
| 2010/0060000 A1* | 3/2010 | Scholte-Wassink | ............... | F03D 7/0272 290/44 |
| 2011/0163544 A1 | 7/2011 | Gupta et al. | | |
| 2012/0221159 A1* | 8/2012 | Olesen | ............... | F03D 7/0284 700/292 |
| 2013/0182465 A1 | 7/2013 | Wang et al. | | |
| 2017/0358997 A1* | 12/2017 | Andersen | ............ | H02M 5/4585 |

FOREIGN PATENT DOCUMENTS

| | | |
|---|---|---|
| EP | 1995863 A2 | 11/2008 |
| EP | 2080900 A2 | 7/2009 |
| EP | 2161443 A2 | 3/2010 |
| EP | 2492504 A1 | 8/2012 |
| KR | 101168030 B1 | 7/2012 |
| WO | 2008108770 A1 | 9/2008 |
| WO | 2009050015 A2 | 4/2009 |
| WO | 2013063224 A1 | 5/2013 |

OTHER PUBLICATIONS

Danish Search Report for PA 2014 70652, dated Jun. 8, 2015.
Maria Zulqarnain et al.: "Multi modular converters with automatic interleaving for synchronous generator based mind energy system", Power Electronics and Motion Control Conference (IPEMC), 2012 7th International, IEEE Jun. 2, 2012, pp. 2255-2261.

* cited by examiner

WIND-TURBINE CONVERTER CONTROL FOR MODULAR STRING CONVERTERS

FIELD OF THE INVENTION

The invention relates to wind-turbine converter control and, for example, to a wind-turbine converter system, a wind turbine with such a converter system, and method for converting variable-frequency electrical power produced by a variable-speed wind turbine into fixed-frequency electrical power to be fed into an electricity grid.

BACKGROUND

EP 2 475 061 A1 describes a controller arrangement of a power transfer system of a wind turbine. The system has two converters and two controllers. Normally, the first and second controllers control the first and second converters, respectively. In the event of a fault of a converter controller control of the associated converter is handed over to the other controller, which then controls both converters.

SUMMARY OF THE INVENTION

A wind-turbine converter system arranged to convert variable-frequency electrical power produced by a variable-speed wind turbine into fixed-frequency electrical power to be fed into an electricity grid is provided, wherein operation of the wind turbine is controlled by a wind-turbine controller. The wind-turbine converter system comprises a converter and a converter controller. The converter comprises a plurality of converter strings that are arranged to perform conversion operation, wherein at least a first converter string and a second converter string are provided. The converter controller comprises a plurality of converter-string controllers associated with the converter strings, wherein at least a first converter-string controller and a second converter-string controller are provided to control the conversion operation of the first and second converter strings, respectively. The first and second converter-string controllers are arranged to operate in a master-slave relation relative to each other. The first converter-string controller is arranged to operate as a master-converter controller, and the second converter-string controller is arranged to operate as a slave-converter controller. The master-converter controller is arranged to receive superordinate control commands from the wind-turbine converter system, to provide the slave-converter controller with string-control commands on the basis of the superordinate control commands, and to control the conversion operation of the first converter string on the basis of the superordinate control commands. The slave-converter controller is arranged to receive the string-control commands from the master-converter controller and to control the conversion operation of the second converter string on the basis of the string-control commands received.

According to another aspect a wind turbine comprising such a converter system, a nacelle housing a generator and mounted on a tower is provided.

According to another aspect a method is provided of controlling a converter for converting variable-frequency electrical power produced by a variable-speed wind turbine into fixed-frequency electrical power to be fed into an electricity grid. The operation of the wind turbine is controlled by a wind-turbine controller. The method comprises: performing conversion operation by a converter with a plurality of converter strings, including at least a first converter string and a second converter string; and controlling the converter by a converter controller having a plurality of converter-string controllers associated with the converter strings, wherein at least a first converter-string controller and a second converter-string controller are provided to control the conversion operation of the first and second converter strings, respectively. The first and second converter-string controllers operate in a master-slave relation relative to each other, the first converter-string controller operates as a master-converter controller, and the second converter-string controller operates as a slave-converter controller. The master-converter controller receives superordinate control commands from the wind-turbine controller, provides the slave-converter controller with string-control commands on the basis of the superordinate control commands and controls the conversion operation of the first converter string on the basis of the superordinate control commands. The slave-converter controller receives the string-control commands from the master-converter controller and controls the conversion operation of the second converter string on the basis of the string-control commands received.

GENERAL DESCRIPTION, ALSO OF OPTIONAL EMBODIMENTS OF THE INVENTION

The wind-turbine converter system is arranged to convert variable-frequency electrical power produced by a variable-speed wind turbine into fixed-frequency electrical power to be fed into an electricity grid.

Such converter systems of a variable speed wind-turbine convert three-phase AC power with a variable frequency, produced by a wind turbine generator in depending on wind speed to AC power of a fixed-frequency, e.g. 50 Hz or 60 Hz, to be fed into the grid. To achieve this, variable frequency AC current is first converted to DC current by the converter system and this DC current is converted to the AC current corresponding to the fixed-frequency electrical power.

The operation of the wind turbine is controlled by a wind-turbine controller. The wind turbine controller provides the converter system with superordinate control commands, as for example, an active power target or reactive power target to be produced by the wind turbine with a corresponding power factor in response to grid side commands, for example, provided by a wind park controller. Furthermore, the wind turbine controller initiates e.g. certain operation modes, such as a shut-down operation mode, a synchronization mode (when starting up the wind turbine), or a fault ride through operation mode (when a grid fault, such as a voltage dip is detected).

The wind-turbine converter system comprises a converter and a converter controller. The terms "converter" and "converter controller" are to be understood as functional entities. A converter is for example an entity that converts the aforementioned AC current of variable frequency to a DC current of a DC link and converters this DC current to an AC current of variable frequency, i.e. it performs a conversion operation. The converter controller is an arrangement that is capable of receiving superordinate control commands from the wind turbine controller, interpreting these commands and finally, of turning these commands into concrete control commands for the converter or to functional parts of the converter. The converter controller is further arranged to collect and analyze current status data from the converter and to send status reports on the basis of this collected data to the superordinate wind-turbine controller.

The converter, controlled by the converter controller, includes a plurality of converter strings that are arranged to perform the conversion operation, wherein at least a first converter string and a second converter string are provided. The converter strings are a functional part of the converter system, as a converter string is capable of rectifying at least a part of the variable frequency AC voltage produced by the generator and/or is capable of inverting at least a part of the DC link voltage resulting from this rectification. The first and second converter strings are, for example, electrically coupled in parallel or, alternatively, the converter strings are fed by separate armature windings of the generator that are electrically isolated from each other and are coupled to separated transformer windings that are isolated from each other, i.e. the converter strings are separated and functionally parallel to each other. These converter strings may have a common DC link or may have separated DC links.

The converter controller that controls the converter, is equipped with a plurality of converter-string controllers associated with the converter strings. Each of these converter-string controllers is, for example, arranged to control its associated converter string. Alternatively or additionally, the converter-string controller is, for example, arranged to control its associated string, as well as at least one other converter-string. In any case, at least a first converter-string controller and a second converter-string controller are provided to control the conversion operation of the first and second converter string, respectively. The conversion operation of the first and second converter-string is, for example, controlled by these first and second converter-string controllers by selecting switching states and switching times of the switching elements of the inverters of the respective strings. These switching elements are, for example, part of two level inverters with a three-phase current output and may be realized as insulated-gate bipolar transistor switches (IGBT switches).

The term "inverter" is used in this document to refer to an element of a converter string that converts AC power to DC power as well as to an element of the converter string that converts DC power to AC power.

The first and second converter-string controllers are arranged to operate in a master-slave relation relative to each other. The first converter-string controller is arranged to operate as a master-converter controller, and the second converter-string controller is arranged to operate as a slave-converter controller. This master-slave relationship between those two converter string controllers is further described below:

The master-converter controller is arranged to receive superordinate control commands from the wind-turbine controller, such as an active power or reactive power target value to be fed to the electricity grid by the wind turbine. The master-converter controller is further arranged to provide the slave-converter controller with string-control commands on the basis of the superordinate control commands received from the superordinate wind turbine controller. This means that the string-control commands for the slave-converter controller are derived by the master-controller such that the superordinate control commands of the wind turbine controller are respected, e.g. the overall active power production target value, demanded by the wind turbine controller, is reached.

These string-control commands for the slave-converter controller are, for example, adapted to a current energy conversion status of the second converter string, i.e. the converter string controlled by the slave-converter controller. Examples for the current energy conversion status are an amount of active power produced by the at least one inverter of this converter string and the voltage level at which this amount of active power is created or, to provide another example, a momentary phase angle between current and voltage produced by this at least one inverter of this converter string.

The slave-converter controller is arranged to receive the string-control commands from the master-converter controller that were provided to the slave-converter controller as described above. The slave converter is arranged to control the conversion operation of the second converter string on the basis of the string-control commands received. Also this conversion operation is, for example, controlled by providing switching states and switching times for the switching elements of the inverters of the second string.

The master-controller is further arranged to control the conversion operation of the first converter string on the basis of these superordinate control commands. The first converter string is the converter string associated with the master-converter controller. The master-converter controller derives string-control commands for the first string, i.e. the string associated with the master-converter controller, on the basis of the superordinate control commands received from the wind-turbine controller. These string commands are adapted to the current energy conversion status of the associated first converter string. These string commands for the first string, derived from the superordinate control commands, may then be used by the master-converter controller to control the conversion operation of the first string.

Alternatively, the master-controller controls the conversion operation of the first string directly on the basis of the superordinate control commands, e.g. the master controller directly derives switching states and switching times for its associated string, i.e. the first string, and derives string control commands for the slave controller, i.e. the controller that is arranged to control the second string, on the basis of the superordinate control commands, but also with respect to the conversion operation of the first string.

An example of a control sequence in the converter arrangement described above may be as follows: the wind turbine controller sets an active power target value to be provided to the grid by the wind turbine. Optionally, the master-converter controller may add an internal power consumption of the wind turbine to this active target value (the internal power consumption is the power consumed by auxiliary circuits in the wind turbine, such as circuits for safety and control functions. This power consumption is typically extracted from the active power supplied to the grid). The resulting active power target, optionally corrected by the internal power consumption, is then split to result in active power targets for the first and second string. These active power targets are provided as separate string-control command to the first and the second string. The conversion operations of these strings is controlled on the basis of these string commands, respecting the current active power production of the first and second strings.

By introducing such a master-slave relationship between the converter-controllers for the respective converter-strings, it is ensured that only one of the converter-controllers, namely the master converter controller has to be reprogrammed if, for example, there is a change in the way string commands are derived from superordinate wind turbine controller commands changes or there is a change in the way power-conversion-control commands are derived. To stick with the above example, if the power required to cover the internal power consumption is only going to be extracted from the first converter string, and not from the power of all converter strings together, the string-control active power command for the first string would be an active power command from the wind turbine controller divided by the number of converter strings plus the internal power consumption. The active power targets for the other converter strings would still be the overall active power target divided by the number of converter strings.

As the slave converter controller is arranged to receive only the corresponding string-control command from the master-converter controller and to follow this command, the slave-converter controller does not need to be reprogrammed if such changes in the processing of superordinate control commands occur. If both controllers were arranged to derive the string-control commands for their respective strings independently from each other, both controllers would have to be reprogrammed.

Furthermore, only the master-converter controller has to be equipped with software and hardware that is needed to derive string-operation control commands on the basis of said superordinate control commands received by the wind-turbine controller.

In some embodiments, the master-converter controller comprises a master-control module, and at least one string-operation-control module. These modules are, for example, (alt1) separate electronic circuits/processors physically integrated in the master-converter controller, meaning that these modules are separate physical entities. Alternatively (alt2) they are, for example, different processes performed concurrently by the same processors integrated into the master-converter controller, meaning that these modules are, e.g. programs performed on the same physical entity(-ies). The master-control module is arranged to derive string control commands on the basis of the commands received from the superordinate wind turbine controller. The string-operation control module is, for example, arranged to carry out these string-control commands. The master-converter controller is further equipped with an interface to the wind-turbine controller, and an interface to the slave-converter controller. The interface to the wind turbine controller enables the master-converter controller to receive commands and/or send status reports to the wind turbine controller.

If alternative 1 mentioned above (alt 1) is implemented, the master-controller module may be equipped with interfaces to transmit and receive commands and status reports, which may, for example, be realized as serial interfaces, such as interfaces of a high speed Ethernet connection between these controllers, using, for example a transport control protocol, such as TCP, combined with an internet protocol, such as IP, for receiving commands and sending status reports. Other examples for such interfaces are high speed serial link (HSSL) interfaces, or control area network (CAN) interfaces.

If alternative 2 mentioned above (alt 2) is implemented, the master-controller module and the at least one string-operation control module may, for example, be connected to common interfaces for both modules, as they are different processes, performed on the same electronic circuits/processors.

In these embodiments, the slave-converter controller comprises at least one string-operation-control module and an interface to the master-converter controller. This interface is, together with the interface of the master-converter controller to the slave-converter controller, used to provide a "communication link" between the master-converter controller and the slave-converter controller. The interface of the slave-converter controller to the master-converter controller is, for example, an interface of the same type as the interface of the master-converter controller to the slave-converter controller. To provide an example, these interfaces are both high speed Ethernet interfaces or CAN interfaces.

Thereby, the master-converter controller is arranged to receive the superordinate control commands via the interface to the wind-turbine controller, and to provide the string-control commands, derived on the basis of the superordinate control commands by the master-converter-controller, as mentioned above, to the slave-converter controller via the interface to the slave-converter controller.

The slave-converter controller is arranged to receive the string-control commands from the master-converter controller via the interface to the master-converter controller. The at least one string-operation control module, comprised by the slave-converter controller, is, for example, arranged to carry out these string-control commands.

In these embodiments, the slave-converter controller does not need to have an interface to the wind-turbine controller and is therefore not arranged to receive commands from, or send status reports to, the wind turbine controller.

In some embodiments, the master-control module and the at least one string-operation-control module of the master-converter controller are integrated into a common master-converter-controller unit. If there is a plurality of string-operation control modules, at least one of these string-operation control modules is integrated, meaning that not all string-operation control modules are necessarily integrated into the master-converter control unit. To provide an example, the string-operation control module, arranged to control the generator side conversion from AC current provided by the generator to DC current, is integrated, while the string operation control module, arranged to control the grid side conversion from DC current to AC current is not integrated. Another example would be, that string-operation control units arranged to control energy dissipation of the corresponding converter strings are not integrated, while string operation control units, arranged to select switching states and switching times of the inverters of the corresponding string, are integrated into this unit.

The master-converter-controller unit provides an internal communication link for string-control commands from the master-control module to the at least one string-operation-control module of the master-converter controller. If these modules are realized as separate electronic circuits/processors, which are physically integrated in the master-converter controller, the internal communication link is, for example, a physical communication link between the electronic circuit/processor representing the master-controller module and the electronic circuit(s)/processor(s) representing the at least one string-operation-control module, e.g. an Ethernet connection or a common bus connection between those separated electronic circuits/processors.

If these modules are realized as different processes performed concurrently by the same processors integrated into the master-converter controller, the internal communication link is, for example, a program interface between the processes provided by the underlying operating system and enabling inter-process communication.

In some embodiments, the converter strings comprise grid-side and generator-side inverters. The generator-side inverter convers variable frequency AC-current into DC current, whereas the grid-side inverter converts DC current into AC current.

In these embodiments the master-converter controller and the slave-converter controller comprise a grid-side string operation-control module to control the conversion operation of the grid-side string inverter belonging to their associated string. To provide an example, the switching states and switching times of the switches of the grid-side string inverter, being responsible for the DC-current to fixed frequency AC-current conversion part the strings conversion operation, are controlled by the grid-side string operation-control module of the master-converter controller.

The master-converter controller and the slave-converter controller further comprise generator-side string-operation-control module(s) to control the conversion operation of the generator-side inverter belonging to their associated string. To stick with the example provided above, for example, also the switching states and switching times of the switches of the generator-side string inverter, being responsible for the variable frequency AC current to DC current conversion are controlled by the generator-side string operation-control module of the master-converter controller.

The grid-side operation-control module and the generator-side string operation control module of the respective master-converter controller or slave-converter controller can be separated from each other, as the grid-side operation control module and the generator-side operation control module are associated with different tasks, namely controlling the grid-side or generator-side inverter(s) of a respective converter string. Therefore, the grid-side operation control module is, for example, located near the grid-side inverter(s) of the converter string and the generator-side operation control module is, for example, located near the generator-side inverter(s). Hence, these operation control modules can, for example, be directly connected to the respective generator-side or grid-side inverters, leading to the result that no costly/lengthy couplings from these operation control modules to their respective inverters are needed, as would be needed if these control modules were remotely located from the inverters they control.

In some embodiments, the at least one string-operation-control module, integrated along with the master control module in the common master converter-controller unit is the grid-side string-operation control module. This grid-side string-operation-control module, for example, receives string commands from the master control module via the internal communication link and derives, also in dependence on status reports received from the generator-side string-operation-control module, (i) control commands that the grid-side-string-operation control module applies itself to the grid side inverters and (ii) control commands for the generator-side string-operation-control module.

Alternatively, the generator-side string-operation-control module is integrated along with the master-control module in the master converter controller unit. Then, for example, the generator-side-operation-control module derives control commands for the grid-side string-operation-control module and receives status reports from the grid-side module, in analogy to the example described above.

This arrangement of generator-side and grid-side string-operation-control modules makes further splitting of control commands for generator-side/grid-side string-operation-control modules possible. Thereby, with this arrangement it is possible to control the grid-side/generator-side inverters by the generator-side or grid-side string-operation-control module in dependence on the controls received from the respective superordinate string-operation-control module (either the generator-side string-operation-control module or the grid-side string-operation-control module).

In another alternative embodiment, both the grid-side and the at least generator-side string-operation-control modules are integrated along with the master-control module into the common master-converter controller unit.

In some embodiments, the slave-converter controller is also equipped with a master-control module and is arranged to continue master-control operation in place of the failed master-converter controller, upon a failure of the master-converter controller.

A failure of the master-control module of the master-converter controller does not imply that the entire master-converter controller suffers a fault, but rather that only its master-control module is faulty and the string-operation control module of said master-converter controller is still capable of performing normal string-control operation.

Such a capability of providing full operation of the converter control system, regardless of a fault of one of its subcomponents, namely the master-converter controller, is also referred to as "failover". The master-converter controller module and the slave-converter controller module include each at least both a master control module and at least one string-operation-control module, as well as internal communication links between these master-controller modules and the string-operation-control modules of the respective master or slave-converter controller module.

Furthermore, the slave-converter controller and the master-converter controller are each equipped with an interface as described above, so that these controllers are able to communicate with each other. In these embodiments, the slave-converter controller also has an interface to the superordinate wind turbine controller. Therefore, the slave converter controller is also arranged to receive superordinate control commands from the wind-turbine converter system, to provide the failed master-converter controller with string-control commands on the basis of the superordinate control commands, and to control the conversion operation of its associated converter string on the basis of the superordinate control commands. The failed master-converter controller is further arranged to receive the string-control commands from the slave-converter controller now acting as master-converter controller and to control the conversion operation of its associated converter string on the basis of the string-control commands received, in the event of a fault of its master-converter control module.

During normal operation, i.e. if the master control module of the master-converter controller operates without a fault, the master control module of the slave-converter controller is, for example, as a default setting, inactive. In the event of a fault of the master-converter controllers master control module this module sends, for example, an automatically issued emergency hand-over request to the slave-converter controller module over the interfaces coupling them. In response to this signal, the first inactive master control module of the slave-converter controller becomes active, and thereby the former slave-controller module continues the master controller operation.

Alternatively, the master-converter controller's master control module, for example, sends "alive signals" continuously to the slave converter-controller module. If these alive signals cease, upon a fault of the master control module, the master control module of the slave-converter controller becomes active.

The provision of such a failover functionality, it is ensures that the converter system continues normal control operation, even in the event of a fault of a master control module.

In some embodiments in which the converter strings comprise grid-side string inverters and generator-side string inverters, the generator-side string inverters of the plurality of converter strings are connected in series. Furthermore, in these embodiments also the grid-side string inverters of the plurality of converter strings are electrically connected in series.

In these embodiments, each converter string, for example, has a plurality of grid-side string inverters that are electrically connected in parallel and/or a plurality of generator-side string inverters that are electrically connected in parallel. These parallel connected grid-side or generator-side inverters are further referred to as "inverter threads". Such inverter threads reduce the maximum current passing through each of the electrically parallel connected inverters, and thereby reduce stress on the semiconductor switches of these inverters.

Due to the series connection of the generator-side and/or grid-side string inverters or corresponding inverter threads the total DC voltage outputted by the generator-side string inverters (or inverter threads) is increased, and the DC voltage being inverted to AC voltage by the grid side by each grid-side string inverter (or each grid-side inverter thread) is reduced for each grid-side string inverter (or inverter thread). To provide an example, due to the series connection of two simple generator-side string inverters the overall output voltage provided by these two inverters is increased (here doubled) compared to the output voltage of a single generator-side string inverter. On the other hand, at a given DC voltage level two series connected grid-side string inverters only see a voltage drop among them that is half the given DC voltage level.

In some embodiments, the series connection of the generator-side string inverters and the series connection of the grid-side string inverters are connected back-to-back with their DC sides, thereby forming a common DC link.

In these embodiments, the common DC voltage level outputted by the series connection of the generator-side string inverters or corresponding generator-side inverter threads of different converter strings, is fed to the series connected grid-side string inverters or corresponding grid-side inverter threads of different converter strings.

To achieve such a series connection of generator-side string inverters and grid-side string inverters on both sides (generator-side and grid-side), the generator-side string inverters are, for example, connected to separate armature windings of the generator that are isolated from one another and the grid-side string inverters are, for example, connected to separated transformer windings that are isolated against one another.

By providing the common DC link with increased DC output voltage, it is possible to transport power from the grid-side string inverters to the generator-side inverters with conductors, such as copper cables with increased electrical resistivity, and hence, lower diameter and greater length. This is the case, as the transmitted voltage is increased and therefore, to yield the same transmitted power, the current can be decreased accordingly, corresponding to a respective higher electrical resistivity of the conductor. Hence the amount of conductive material needed to transmit power from those generator-side inverters to those grid-side inverters is reduced and, moreover, also current-dependent power losses are reduced.

In some embodiments, the series connection of the generator-side string inverters and the series connection of the grid-side string inverters each form a neutral-connection point and the neutral-connection points of the generator-side and of the grid-side are connected to each other by a center-connection line and these connection points are clamped to neutral potential.

In these embodiments, the positive DC level output of the generator-side string inverter(s) of a certain string, for example the first string, is applied to a positive DC conductor, whereas the negative DC level output level of the generator-side string inverter(s) of this string is applied together with a positive DC level output of the generator-side string inverter(s) of, for example the second string, to the center-connection line that in turn is clamped to neutral potential. The negative DC level output of the second string is applied to a negative DC conductor.

Thereby, a series connection of grid-side string inverters is achieved, forming a neutral connection point as mentioned above.

The positive DC level input of the grid-side string inverter of, for example the first string, is connected to the positive DC conductor. The negative DC level input of this grid-side string inverter is together with the positive DC level input of the grid-side inverter of the second string connected to the center connection line. The negative DC level input of the grid-side inverter of the second string is connected to the negative DC conductor.

Since the current generated by the wind turbine generator is split into two current paths, i.e. the positive DC conductor and the negative DC conductor, the current dependent power losses within each path are reduced. Provided that the positive DC conductor and the negative DC conductor have the same absolute potential, for example 1 kV between the positive DC conductor and the center-connection line and −1 kV between the center-connection line and the negative DC conductor, no current flows on this center-connection line. However, should the absolute value of these potentials differ from each other, an (undesired) compensating current will flow between the two converter strings.

In some embodiments, the grid-side inverters of a string are located in the tower of the wind turbine near to the transformer windings that couple the wind turbine to the grid and the generator-side inverters of a string are located in the nacelle of the wind turbine, in these embodiments the string-operation controller and the master-converter control module comprised by a common master-converter-controller unit, are for example, also located in the tower of the wind turbine, near to the transformer windings. In this way fewer components of the converter system are located in the nacelle, since only the grid-side inverters of the converter strings are located in the nacelle and maintenance either of the master-converter-controller unit, for example, by reprogramming this unit and also maintenance of the grid-side inverters is eased, as the tower of a wind turbine is easier to access than the wind turbines nacelle. Furthermore, the overall weight of converter system components located in the nacelle is reduced, leading to reduced stress on a yaw bearing, connecting the nacelle to the tower and enabling the nacelle to rotate about an axis given by the tower of the wind turbine. In addition, less heat is produced in the nacelle, as only the generator-side inverters, producing heat during the conversion operation, are located in the nacelle. This leads to further reduction of thermal stress on the generator-side as well as the grid-side inverters.

In these embodiments the center-connection line, the positive DC conductor and the negative DC conductor as well as the neutral center connection line are guided from the nacelle to the tower via a common DC connection line, electrically isolated from each other. The length of these conductors and the DC connection line corresponds to the distance between the grid-side inverters (tower) and the generator-side inverters (nacelle). These conductors extend therefore over a distance from, e.g. 5 to 300 m.

In some embodiments, the master-converter controller is arranged to combine operation electrical data relating to the converter string associated with the master-converter controller with operation electrical data relating to the converter string associated with the slave-converter controller and obtained from the slave-converter controller. The master-converter controller is arranged to provide the combined operational electrical data to the wind-turbine controller.

Operational electrical data relating to a converter string may include, for example, the amplitudes and phases of the voltage and currents at the generator and the grid side of the individual strings, active/reactive power output of the individual strings, a momentary voltage of the string, e.g. the voltage between the center connection line and the DC voltage in the DC link associated with the individual string, for example, measured in the converter string associated with the master-converter controller as well as in the converter string associated with the slave-converter controller.

In these embodiments, the master-converter controller combines, for example, the currents and/or active/reactive powers and/or the DC link voltages of the first string—associated with the master-converter controller—and the second string—associated with the slave-converter controller.

In embodiments in which the combined operational electrical data represents first of all electrical quantities, the master-converter controller combines for example, the momentary power active and reactive power output of the aforementioned first converter string and the aforementioned second converter string is determined. These active/reactive power outputs of the strings are, for example, combined by the master-converter-controller to obtain, a total active power output for the converter strings and/or a total reactive power output of the strings. To provide another example, also a combined power factor for the power output of all the strings together is determined by the master controller on the basis of these total active and reactive power outputs.

This exemplary operational electrical data is provided to the wind turbine controller, which then adjusts the commands provided to the master-converter-controller according to the combined operational electrical data received from the master-converter-controller.

In some embodiments the string control commands provided by the master-converter controller comprise at least one of active-power and reactive-power targets for the electrical power to be fed into the grid by the first and second converter strings. As already mentioned above and also hereinafter, on the basis of total active/reactive power commands received by the master-converter controller from the wind turbine controller, string-control commands regarding the active/reactive power production of the respective strings are derived, for example, by the master convert control module and then distributed to the string operation module of the master-converter controller (controlling the first converter string associated with the master-converter controller) and the string operation control module of the slave converter controller (controlling the second converter string—associated with the slave-converter controller). The active power and reactive power targets are, for example, provided as target values in various mathematically equivalent forms. For example if n converter strings are controlled by the master-converter controller(s) and the slave-converter controller(s), a set of target values provided by the wind turbine controller is "x MW" and "z MVAR", and the targets for the converter strings, i.e. the string-operation commands are then given by "x/n MW" and "z/n MVAR".

These target values for the converter strings may, however, be expressed in other mathematical equivalent forms, such as an apparent power multiplied by the power factor, i.e. the cosine of a given phase angle between current and voltage produced by a converter string, yielding the active power target in MW, and the apparent power multiplied by the sine of a given phase angle between current and voltage, yielding the reactive power target in MVAR.

Also the overall active/reactive power targets provided by the superordinate wind turbine controller may be provided in these mathematical equivalent forms.

The first and second converter-string controllers are arranged to control their associated converter strings according to the at least one of the active-power and reactive-power targets independently of each other.

In some embodiments, in which the series connection of the generator-side string inverters and the series connection of the grid-side string inverters are connected back-to-back with their DC sides and the series connection of the generator-side string inverters and the series connection of the grid-side string inverters each form a neutral-connection point and the neutral-connections points of the generator-side and of the grid-side are connected to each other by the aforementioned center-connection line, the master-converter controller is arranged to measure current in the center-connection line and is arranged to limit the current flowing in the center-connection line. Measuring the current on the center-connection line is, for example, achieved by current-sensor(s), integrated within the master-converter-controller unit and connected to the master-control module.

The current flowing on the center-connection line is, for example, reduced by adjusting active and reactive power targets for the converter strings, the neutral connections points of which are connected by this center-connection line, e.g. the converter-string associated with the master-converter controller and the converter-string associated with the slave-converter controller. If the active and/or reactive power targets are unequal for these strings, the absolute of the positive DC voltage between the positive DC conductor and the grounded center-connection line and the absolute of the negative DC voltage between the negative DC conductor and the grounded center-connection line are, in general, not equal. This is the case, as the generator-side inverters of the string feed active and/or reactive power into the common DC link according to these target values for the strings and the grid-side inverters so to say "extract" power from this common DC link according to these target values for the strings. When the active or reactive power fed to or extracted from a potential difference between the positive DC conductor and the center connection line is unequal to the power fed or extracted from a potential difference between the negative DC conductor and the center connection line, the voltage levels between the respective positive or negative DC conductors and the center connection line will differ, leading to said current on the center line.

Therefore, in normal operation mode, the master-converter-controller, for example, derives approximately equal active/reactive power target values for the string operation control module of the master-converter-controller, arranged to control the converter string associated with the master-converter controller, and for the string operation control module of the slave-converter controller, arranged to control the converter string associated with the slave-converter controller. This is achieved, as explained above, for example by either directly dividing the active/reactive power targets received from the wind turbine controller by two, or by first adding the internal power consumption of the wind turbine to these target values received and then dividing the result of this addition by two. These target values are, for example, transmitted to the string-power control modules via the aforementioned interfaces or internal communication links.

To compensate for component differences in the converter strings, as may arise if the inverters of different converter strings do not have exactly equal switching properties, or if there are cable property deviations between the negative DC conductor and the positive DC conductor, the active power/reactive power targets provided to the string-operation controllers are, for example, unbalanced on purpose. The active/reactive power targets are, for example, adjusted by a proportional integral controller (being part of the master-converter control module) that modifies the active/reactive power targets for each string in order to minimize the current flowing in the center-connection line.

Alternatively, the master-converter controller stops the converter operation if the current flowing in the center-connection line is above a given limit. As the current flowing in the center connection line is usually not higher than ten percent of current flowing in the positive DC conductor or the negative DC conductor, the diameter of, for example, a copper cable used as the center connection line, is reduced accordingly. Hence, the electrical resistance of the center connection line is high compared to the resistivity of the positive or negative DC conductors. Therefore, less current can be transmitted over the center connection line compared with these two conductors. Hence, the current limit, that leads to a stop of converter operation is, for example, chosen so that a maximum transmittable current over the center connection is not exceeded.

An increased current flowing in the center connection line may also be used, among other measured parameters, as an indicator for a converter fault, as in the case of a converter fault, the absolutes of the voltage levels between the positive DC conductors/negative are inevitably not equal. Thus, for example, if the current in the center line exceeds such a limit, indicating a converter fault, the converter operation is stopped.

When the converter operation is stopped, the current flow on the center-connection line is automatically limited.

In some embodiments each of the converter strings is equipped with at least one energy dissipator, wherein the converter system is arranged to control energy dissipation by means of the energy dissipators individually for each string.

The function of these dissipators is to dissipate active power by converting the active power into heat. Such dissipators are typically Ohmic resistors with a high thermal capacity. The energy dissipators of a string are, for example, activated if the grid cannot absorb sufficient active power, as for example, in the event that the active power at a point of common coupling of a wind park in which the wind turbine having these converter strings is operated, is already at its active power limit, hence further pushing active power into the grid might damage conductors/transformers at the point of common coupling. These energy dissipators are, for example, also activated if the absorption of active power by the grid is too slow. This may be the case in embodiments with generator-side inverters located in the nacelle and grid-side inverters located in the tower of the wind turbine, as the conductors (representing the extended DC link) between these inverters are extended over a range of 5-300 m, an overvoltage might occur in this extended DC link that cannot be transferred quickly to the grid, due to the inductance of these extended conductors. Hence, in this case a temporary overvoltage in the DC link occurs, that is, for example, dissipated by these energy dissipators in order to prevent damage to the DC link's conductors.

The energy dissipators are, for example, located in this common DC link, more precisely the energy dissipator of the first converter string is, for example, connectable to the positive DC conductor and the center-connection line, whereas the energy dissipator of the second converter string is connectable to the negative DC conductor and the center-connection line. There are, for example, two energy dissipators for each converter-string, one located in the DC link near the generator-side inverters, i.e. in the nacelle, and the other also located in the DC link, near the grid-side inverters, i.e. in the tower of the wind turbine. The nacelle-side energy dissipators are, for example, capable of dissipating a greater amount of active power than the grid-side energy dissipator. The grid-side energy dissipators may therefore also be heavier than their nacelle side counterparts. Since they are located in the tower, the overall weight of power conversion equipment located in the nacelle is further reduced.

The energy dissipators, are, for example, activated by closing motorized chopper-switches that establish an electric connection between the energy dissipators and those conductors. In other words, a series connection between a chopper-switch and an energy dissipator sets up an energy dissipation arrangement.

The activation of the energy dissipation elements and the amount of active power dissipated is controlled independently for each converter string by the string-operation controllers that control the conversion operation of the converter string associated with them. These string-operation controllers are arranged to receive commands from the master converter control module that requests the use of the energy dissipators of at least one string. The master converter controller issues that request, for example, in dependence on a DC-link voltage based criterion, such as the DC voltage of a converter string exceeding a given threshold by more than a given over-voltage. When considering the exemplary converter system with two converter strings and the common DC link, the energy dissipators of a converter-string are, for example, activated if the voltage between the positive DC conductor and the center-connection line exceeds a given threshold of 500V by more than the given over-voltage of 30V.

Energy dissipation is, for example, controlled by a dissipation related string-operation control module, whereas the switching states and switching times of a string are controlled by a different string operation control module, as there are, for example, a plurality of these string operation control models controlled by a single master-converter control unit.

In some embodiments, the converter system is arranged to provide a low-voltage ride-through function controlled individually for each converter string. The low-voltage ride through function enables the wind turbine to continue operation even when transient low voltage events, also referred to as "voltage dips", occur in the grid. The converter strings, for example, stop feeding power into the grid when the voltage dip is very deep; in the event of a very deep dip (typically to a voltage less than 15% of the nominal voltage) the converter strings may even loose synchronization, but they can resynchronize to the grid phase when the grid voltage comes up again towards nominal voltage. In the event of a voltage dip the energy dissipators are actuated independently for each string to dissipate the produced power that cannot be fed to the grid. The string controllers may keep sensing the current phase angle and amplitude of the grid voltage.

When the grid-voltage returns the two string controllers return to normal operation, and will output the commanded power given by the master controller, using the grid voltage angle provided by the individual string controllers.

If there is a voltage peak in the grid, following the low-voltage event, due to self-induction, the energy dissipators are, for example, actuated independently for each string to prevent this voltage peak from damaging converter components, as they are activated when an excess voltage in the DC link is sensed.

The converter system is, for example, also equipped with an uninterruptable power supply, e.g. a battery, which serves as the internal power supply, when the actual internal power supply of the wind turbine is offline due to the desynchronization of the wind turbine.

If such low voltage events also an increased amount of reactive voltage may be fed to the grid, by the respective converter strings. The voltage of each converter-string is, for example, sensed by the string operation control module of the respective string and reactive voltage is fed to the grid by the converter-strings independently from each other, on the basis of the sensings obtained by the respective string operation control module and the active/reactive power targets received from the wind turbine controller.

All the low voltage ride-through activities may also be performed as preprogrammed procedures of the string-operation controllers, independently for each string. For example, a low voltage ride through mode is initiated by the master-converter controller, activating these preprogrammed procedures, such as activating the energy dissipators or feeding voltage and current of a certain phase (angle) to the grid via the separated transformer windings.

According to a second aspect, a wind turbine having a nacelle mounted on a tower and housing a generator is equipped with any embodiment of a converter system previously described.

The generator-side string-inverters of the converter system are arranged in the nacelle of the wind turbine, near the wind turbine generator and each phase input of these inverters is, for example, electrically coupled to phase outputs of a corresponding isolated generator winding. The grid-side string-inverters of the converter system are arranged at a lower part of the tower, inside or outside the tower. The grid-side string operation control module is as mentioned above, for example, integrated along with the master-converter control module in a master-converter control unit. This master-converter control unit is, for example, located at the lower part of the tower.

The master-converter controller has, for example, also a generator-side string operation control module, located in the nacelle, and thereby close to the generator-side inverters to which it is connected. The grid-side and generator side string-operation control modules are connected to each other, wherein the grid-side string operation control module is arranged to provide the generator-side string control modules with commands. The grid-side string-operation control module, for example, derives these commands on the basis of commands of the master-converter control module received for this string that is associated with the master controller. In this example, the generator-side string operation controller was subordinate to the grid-side string operation controller. However, this subordinate relation can also be interchanged.

As mentioned above, by locating the master-converter controller and its components at the lower part of the tower, it is easy to access for reprogramming said master-converter controller and its components or carrying out maintenance procedures. Furthermore, the overall weight of the power conversion components in the nacelle is reduced and thermal stress on the power conversion components located in the nacelle is also reduced.

The generator-side and grid-side inverters are connected by the aforementioned DC connection line along the tower. This DC connection line may be realized as a duct for the positive DC conductor, the center connection line and the negative DC conductor, as mentioned above, in embodiments with a center connection line and a common DC link.

In alternative embodiments, without such a center connection line but with a common DC link, only the positive DC conductor and the negative DC conductor may be part of the DC connection line.

In embodiments without a common DC link, meaning that there is a plurality of converter strings each having a separate DC link, a plurality of positive and negative DC conductors are part of the DC connection line.

According to a third aspect, a method of controlling a converter for converting variable-frequency electrical power produced by a variable-speed wind turbine into fixed-frequency electrical power to be fed into an electricity grid is provided. The operation of the wind turbine is controlled by a turbine controller. The method for controlling the converter is carried out by performing the following activities:

performing conversion operation by a converter with a plurality of converter strings, including at least a first converter string and a second converter string.

controlling the converter by a converter controller that is equipped with a plurality of converter-string controllers associated with the converter strings, wherein at least a first converter-string controller and a second converter-string controller are provided to control the conversion operation of the first and second converter strings, respectively.

The first and second converter-string controllers operating in a master-slave relation relative to each other. The first converter-string controller operates as a master-converter controller, and the second converter-string controller operates as a slave-converter controller. This master-slave relation between the converter-string controllers has already been described above in conjunction with the converter-system of a wind turbine.

The master-converter controller receives superordinate control commands from the wind-turbine controller and provides the slave-converter controller with string-control commands on the basis of the superordinate control commands, such as an active power or reactive power target value to be produced by the wind turbine ore one of the plurality of commands already discussed above.

The master-converter controller controls the conversion operation of the first converter string on the basis of the superordinate control commands. Hence, commands received from the wind turbine controller are, for example, directly transformed into commands controlling the conversion operation of the first string directly, such as commands including switching angles or switching times of the inverters of the first converter string that is associated to the master-converter controller.

Alternatively, string-control commands are derived by the master-converter-controller for the first string, and these are received by a string-operation control module, which in turn controls the conversion operation of the first string associated to the master-converter controller.

The commands controlling the conversion operation of the first string directly or the string-control commands for that string are derived by the master-converter controller so that the such that the superordinate control commands of the wind turbine controller are respected, e.g. the overall active power production target value, demanded by the wind turbine controller, is respected.

The master-converter controller provides the slave-converter controller with string-operation control commands derived by the master-converter controller on the basis of the superordinate control commands received from the wind turbine controller. The master-converter controller derives the string commands for the second string, which are carried out, by e.g. a string-operation control module of the slave-converter controller—associated with the second string. The commands are derived in such a way that, that when the string control commands provided to the slave-converter controller are carried out following the commands derived, and also the conversion operation of the first string is carried out following the commands derived on the basis of the superordinate control commands, the superordinate control commands by the wind turbine controller are respected.

The slave-converter controller receives the string-control commands from the master-converter controller and then controls the conversion operation of the second converter string on the basis of the string-control commands received.

BRIEF DESCRIPTION OF THE DRAWINGS

Exemplary embodiments of the invention are now described, also with reference to the accompanying drawings, wherein FIG. 1 schematically illustrates a wind turbine equipped with a converter system including a generator-side inverter located in the nacelle and a grid-side inverter located in the tower of the wind turbine, FIG. 2 schematically illustrates a converter control system with no redundant components, with a generator-side string operation control module arranged inside and a grid-side operation control module arranged outside of a master-converter controller unit.

The drawings and the description of the drawings are of examples of the invention and are not of the invention itself.

DESCRIPTION OF EMBODIMENTS

Figure 1:
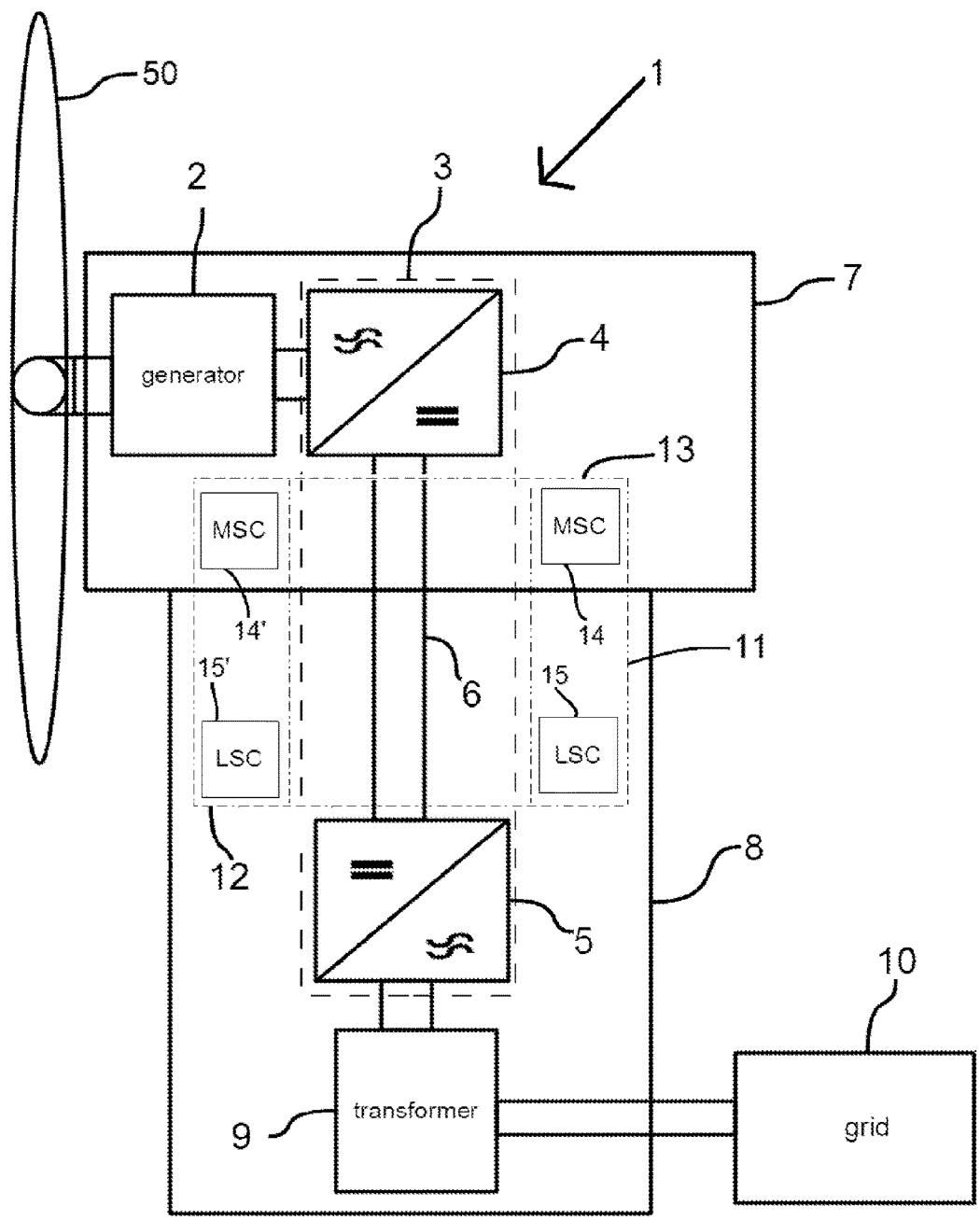

A wind turbine 1 has a nacelle 7 mounted atop a tower 8. The wind turbine 1, schematically illustrated by FIG. 1, is driven by a rotor 50 that is coupled to a generator 2, for example over a gear (not shown), to feed fixed frequency electrical power to an electricity grid 10. The generator 2 generates variable frequency AC current, wherein the frequency of the AC current is depends on wind speed. The variable frequency AC current is fed to a converter system 3, including generator-side inverters 4 connected via a DC connection line 6 to a grid-side inverters 5. The grid-side and generator-side inverters are represented each by a symbol for a single rectifier and a symbol for a single inverter in FIG. 1, for the sake of clarity. The converter system includes at least two converter strings 24, 25 (not shown in FIG. 1), each string is hereby equipped with respective generator-side and grid-side inverters. The generator-side inverters 4 are located in the nacelle 7 of the wind turbine 1, whereas the grid-side inverters 5 are located in the tower 8 of the wind turbine 1.

The generator-side inverters 4 rectify the variable frequency AC current produced by the generator, the resulting DC current is transmitted via the DC connection line 6 and is subsequently converted into fixed frequency AC current by the grid-side inverters 5. This conversion operation of the at least two converter strings 24, 25 is controlled by a slave-converter controller 12 and a master-converter controller 13 associated with a first converter string 25 and a second converter string 24 (not shown), respectively. The slave-converter controller 12 as well as the master-converter controller 13 include a generator-side control module 14', 14 and a grid-side control module 15', 15, respectively. The fixed frequency AC power produced by the grid-side inverters is fed to the electricity grid 10 by a transformer 9.

Figure 2:
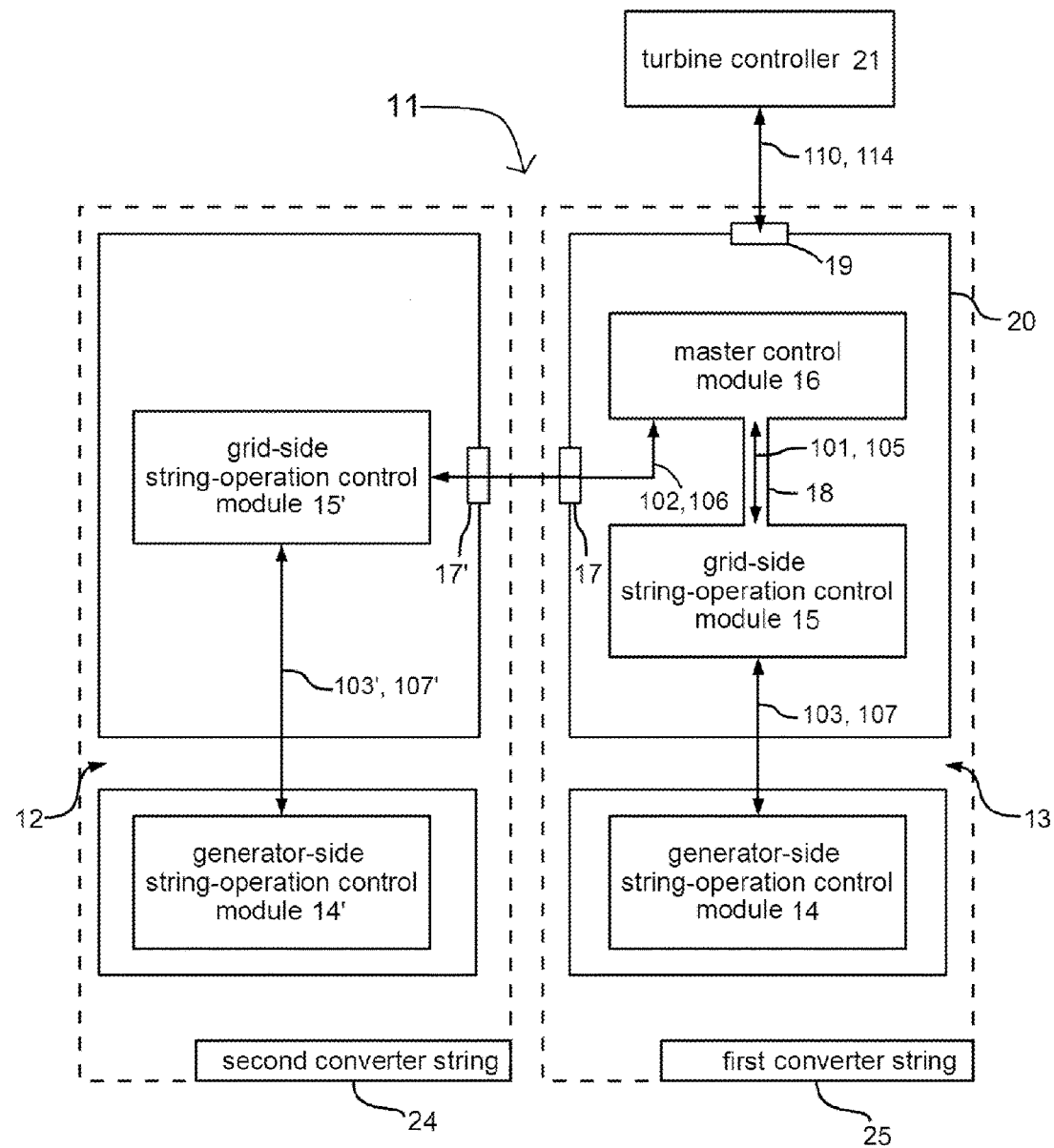

A method of controlling a converter 3 by a converter controller 11 is illustrated by FIG. 2. A turbine controller 21 sends commands 110 to a master-converter controller 13 and receives status reports 114, including combined operational electrical data 114', from the master-converter controller 13 that controls a first converter string 25.

This communication between the master-converter controller 13 and the turbine controller 21 is handled over an interface to the wind turbine controller 19 that is in this example realized as an Ethernet interface. The master-converter controller comprises a master converter control unit 20, in which a master control module 16 and a grid-side string operation control module 15, realized as separate but connected electronic circuits, are physically integrated. The master-control module 16 derives string operation control commands for the grid-side string operation control module 101 which like the master-converter controller is associated with the first converter string 25. These string operation control commands for the grid-side string-operation-control module 101 are transmitted from the master-control module 13 to that string-operation-control module 15 via a common bus bar connecting the two modules that corresponds to an internal communication link 18. The grid-side string operation control module 15 either derives control commands 103 for a generator-side string-operation-control module 14—associated with the first converter string 25 on the basis of the received string-operation control commands received 101 and transmits these derived commands to the generator-side string operation control module 14. The grid-side and generator-side string-operation control modules 15, 14 associated with the first converter string 25 control the conversion operation of the first string 25 in accordance with the commands received 101, by selecting switching states and switching times of their semiconductor switches, so as to carry out the commands received 101.

Hence, the grid-side string operation control module 15 selects switching times and switching states so as to carry out the string control commands received from the master-control module 101, and the generator-side string operation control module 14 selects switching times and switching states so as to carry out the commands received from the grid-side operation control module 103 that were so derived by the grid-side operation control module that the string-operation commands of the master control module are fulfilled.

Furthermore, the grid-side operation control module 15 continuously or on occasion sends status reports 105 to the master control module 16 and the generator-side string operation control module 14 continuously or on occasion sends status reports 107 to the grid-side operation control module 15, too. The status reports include operational electrical data of the respective converter strings.

The master-control module also derives string operation commands for a slave-converter controller 102, i.e. the converter-controller associated with a second converter string 24, on the basis of the commands 110 received by the turbine controller 21. The string control commands for the slave-converter controller 12 are transmitted to this controller 12 via an interface from the master-converter controller to the slave-converter controller 17 and an interface from the slave-converter controller to the master-converter controller 17', both realized as Ethernet interfaces in this example. The slave-converter controller 12—associated with the second converter string 24—is also equipped with a grid-side string operation control module 15', wherein this grid-side string operation control module 15' is arranged to control the second converter string 24. This grid-side operation control module derives control commands for the generator-side string operation control module 103'—associated with the second converter string—on the basis of the string operation commands for the slave-converter controller 102, received from the master-control module 13 and transmits these commands 103' to the generator-side string-operation control module 14'. The grid-side string-operation control module 15' and the generator-side string-operation control module 14' control the conversion operation of the second string in accordance with the commands they receive, hence, by selecting switching states and switching times of their semiconductor switches, so as to carry out the commands received, in analogy to the control of the first converter string.

Furthermore, the grid-side operation control module 15'—associated with the second converter string 24—continuously or on occasion also sends status reports 106 to the master control module 13 and the generator-side string operation control module 14' continuously or on occasion sends status reports 107' to the grid-side operation control module 15', too. The status reports include operational electrical data of the respective converter strings.

As the converter controller 11 including the control modules 13, 14, 15, 14', 15' and the turbine controller 21 mentioned above are carrying out these activities, they are also arranged to/programmed to carry out these activities.

Figure 3A:
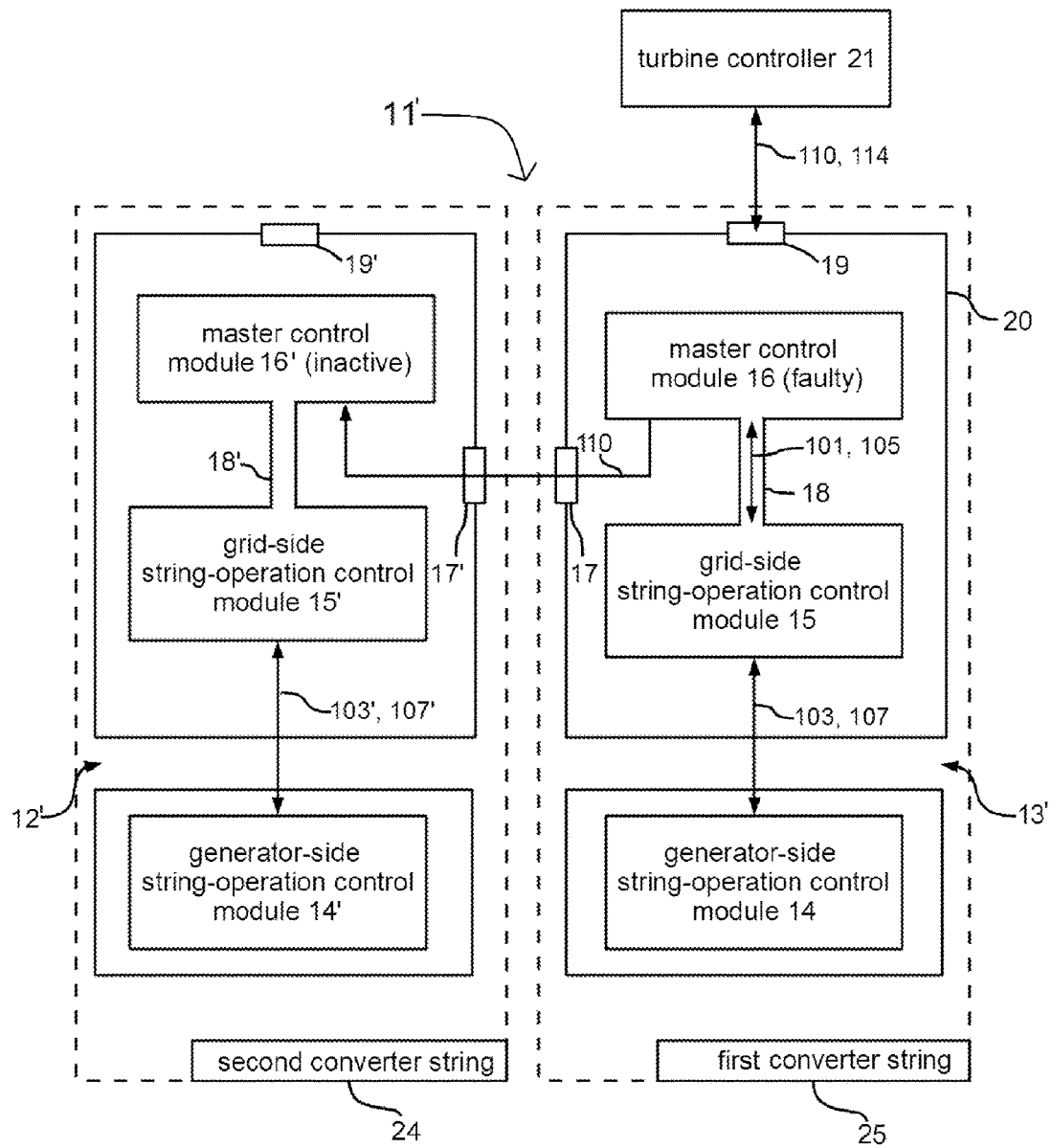
FIG. 3a illustrates the schematic converter control system of FIG. 2 further equipped with redundant components for providing failover functionality, in the moment when a hand-over request is transmitted from a faulty master-control module to a redundant master-control module of the slave-converter controller.

The converter controller 11' and the method of controlling the converter 3 illustrated by FIG. 3a is in principle the same as the method and converter controller 11 illustrated by FIG. 2, except that the converter controller 11', illustrated by FIG. 3a, is equipped with a redundant master control module 16' for providing failover functionality.

The converter controller 11' illustrated by FIG. 3a has a slave converter-controller 12' that is arranged to carry out the tasks of the faulty master-converter controller 13', if the master-control module 16, integrated in the master converter control unit 20 of the master-converter controller 13', suffers a fault.

The slave-converter controller 12' is therefore also equipped with a master control module 16' and an internal communication link 18' between the master-control module 16' and the grid-side string-operation control module 15'. In the normal operation mode, the master control module 16' is inactive. Furthermore, the slave-converter controller 12' also has an interface to the turbine controller 19', to be able to receive commands from and send status reports to the turbine controller in the event of a fault of the master control module 16 of the master-converter controller.

If the master control module 16 fails, an emergency handover request 110 is transmitted to the slave-converter controller 12', or to be more precise to the master control module 16' of the slave-converter controller 12'.

Figure 3B:
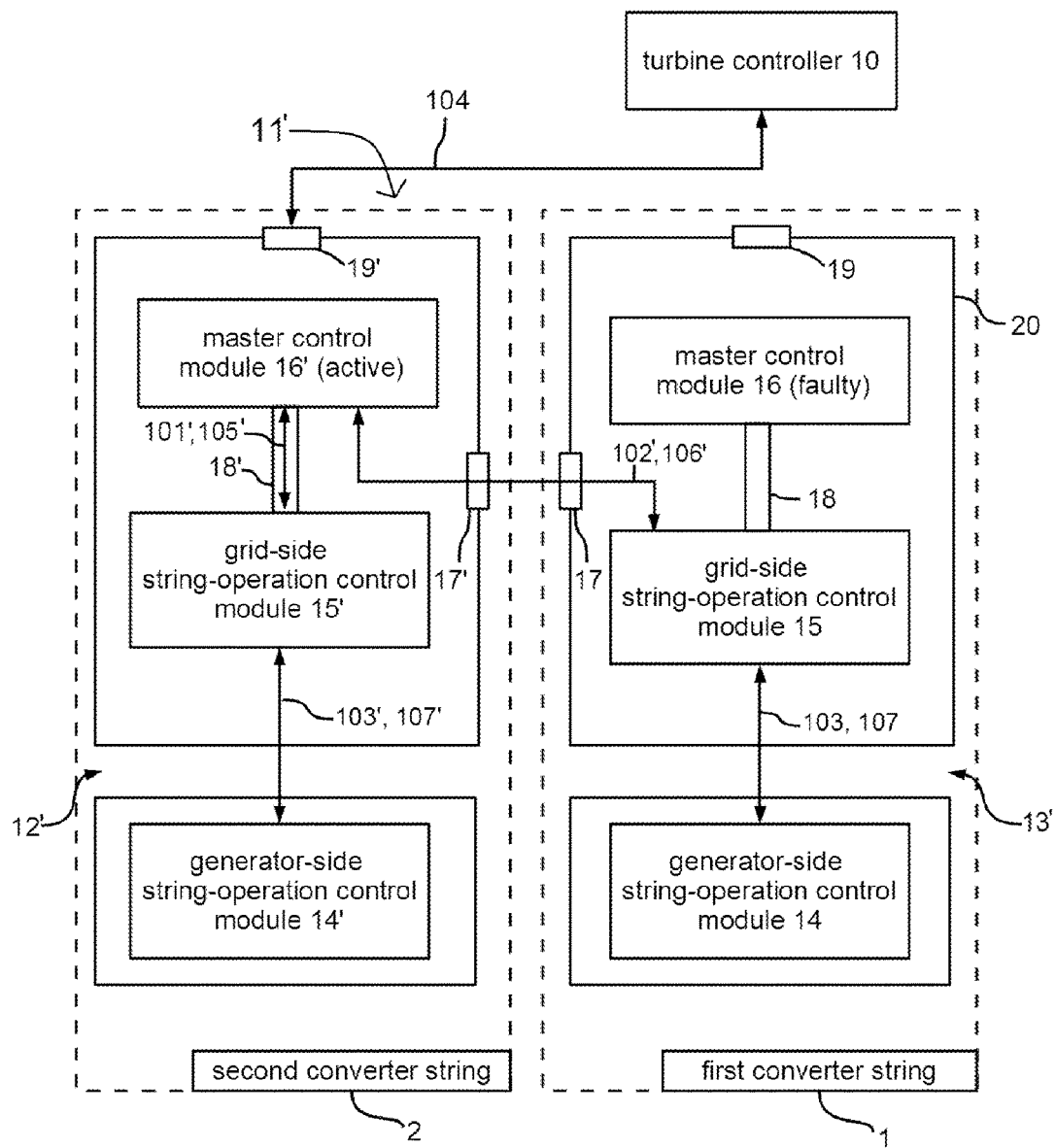
FIG. 3b illustrates the schematic converter control system of FIG. 3a, after the handover request, with the slave-converter controller continuing master-operation.

After receiving the emergency-handover request 110, the previously inactive master-control module 16' becomes active, as illustrated in FIG. 3b. Thereby the former slave-converter controller 12' becomes the new master controller 13'. The master-control module 16' now receives the commands from the wind turbine controller 104 via the interface to the wind turbine controller 19'. The master-control module 16' derives string control commands 101' for the grid-side operation control module 15' and for the grid-side string operation control module 15 of the former master converter controller 13'. Thereby, the tasks of the former master-controller 13' are completely assumed by the former slave controller 12' and the converter control system 11' continues operation even with a faulty master control module 16.

This failover functionality can also be applied in other embodiments.

Figure 4:
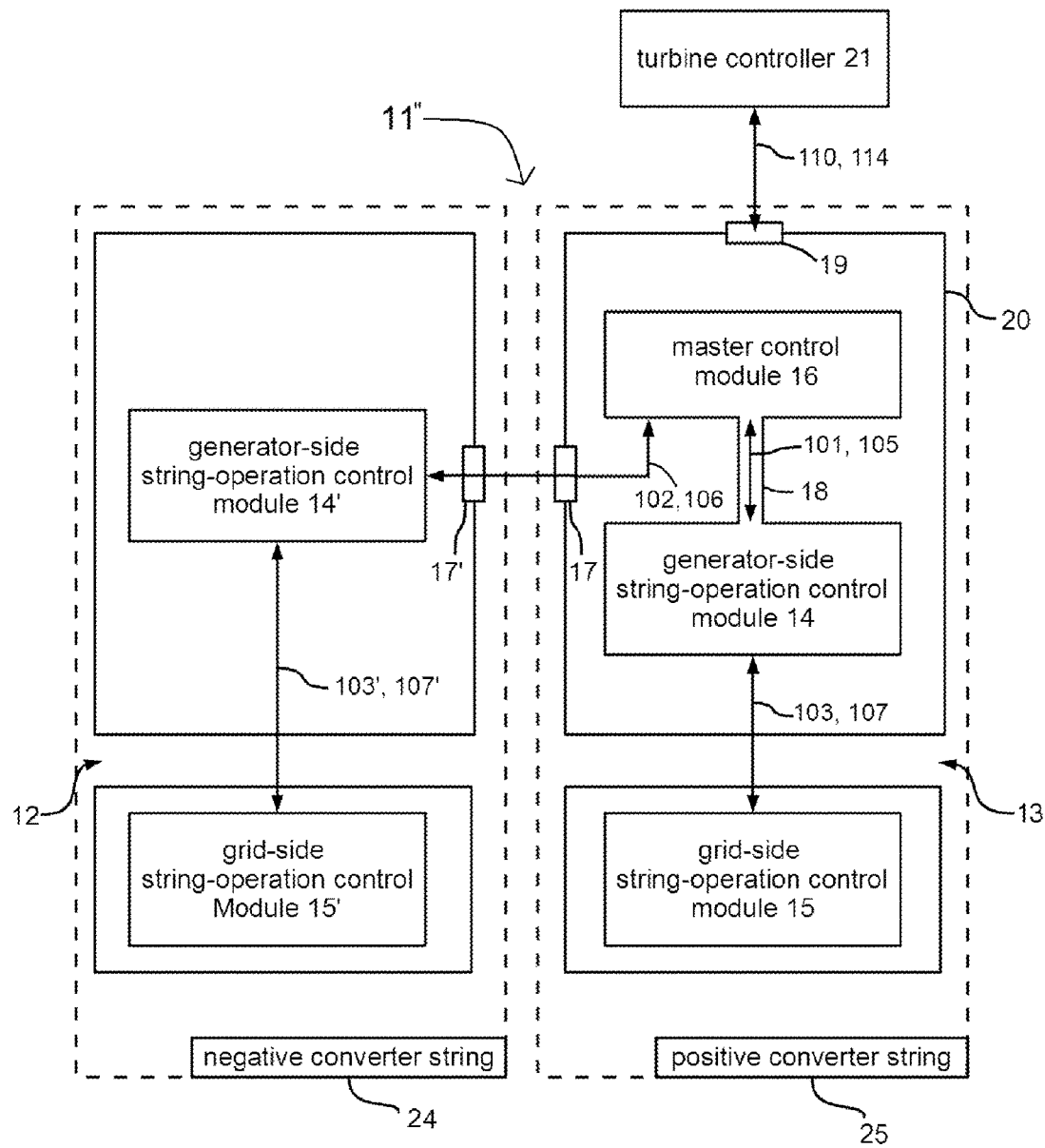
FIG. 4 illustrates the schematic converter control system of FIG. 2, wherein the generator-side string operation control module is integrated into the master-converter controller unit, and the grid-side operation control module is located outside this unit.

The converter controller 11" illustrated by FIG. 4 is in principle identical to the master-control system of FIG. 2, except for the fact that the roles of the grid-side string operation control modules and the generator-side string-operation-control modules of the respective master-converter controller and the respective slave-converter controller are interchanged: The generator-side string operation control module is now integrated along with the master control module 16 into the master converter control unit 20 of the master-converter controller 13, whereas the grid-side string-operation control module 15 is now not integrated in this unit. Thereby the generator-side string-operation-control modules 14, 14' of the master-converter controller 13 and slave-converter controller 12 now derive commands for the grid-side string-operation-control modules 15, 15' of these controllers 12, 13 on the basis of the string operation control commands 101 they receive from the master-control module 16. Only the generator-side string operation control modules 14, 14' are now arranged to receive commands and send status reports to the master control module 16.

The subordination relation between the generator-side and grid-side string operation can also be interchanged in other embodiments.

Figure 5:
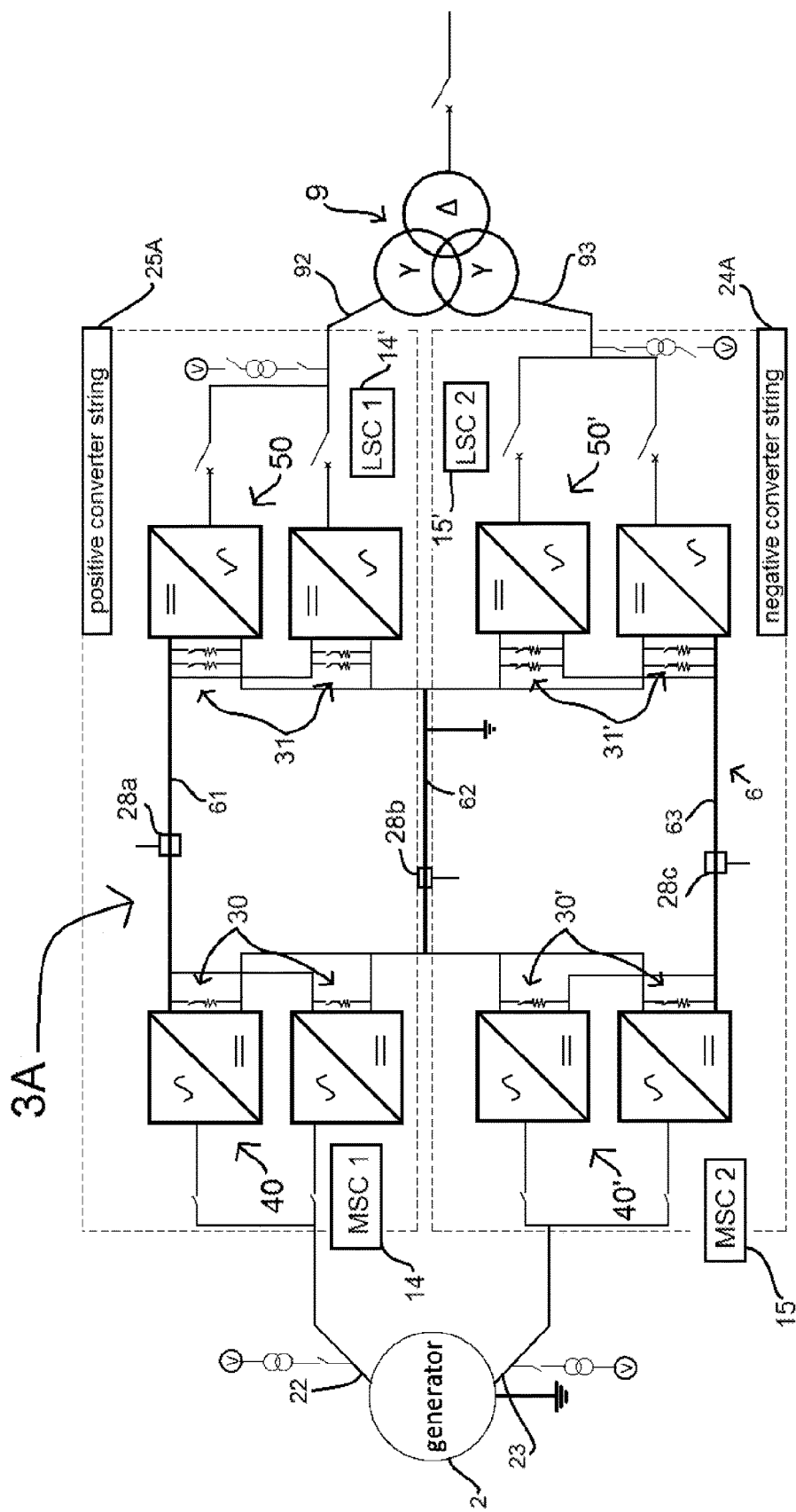
FIG. 5 illustrates a circuitry diagram, representing a converter system with grid-side and generator-side inverter threads, forming a first and a second converter string, wherein the first and second converter string are coupled by a common centre connection line.

An electronic circuitry diagram of an exemplary converter 3A, controlled by one of the converter controllers 11, 11', or 11" of FIGS. 1 to 4 is illustrated by FIG. 5. The generator 2 has two separate generator windings, a first generator winding 22 and a second generator winding 23 that are electrically isolated from each other. The first generator winding 22 is coupled to a first generator-side inverter thread 40 that comprises at least two string inverters electrically connected in parallel. The second generator winding 23 is coupled to at least one second generator-side inverter thread 40' that also comprises at least two string inverters electrically coupled in parallel. The first and second generator-side inverter threads 40, 40' are electrically coupled to each other in series, by connecting the negative DC voltage output of the first generator-side inverter thread 40 to the positive DC voltage output of the second generator-side inverter thread 40', thereby forming a neutral connection point. The positive DC potential of this series connection is coupled to a positive DC conductor 61, whereas the negative DC potential of this series connection is coupled to a negative DC conductor 63. The neutral connection point of the generator-side inverter threads 40, 40' is coupled to a centre connection line 62 that lies on neutral potential.

The positive DC conductor 61 is coupled to a grid-side inverter thread 50 on the grid side. This grid-side inverter thread also comprises at least two grid-side string inverters electrically connected in parallel. The grid-side inverter thread 50 that is coupled to a first separate transformer winding 92, is electrically connected in series to a second separate transformer winding 93, wherein the separated transformer windings 92, 93 are electrically isolated from each other. The two series connected grid-side inverter threads 50, 50' like the generator-side string inverter threads 40, 40' connected to the neutral center connection line 62. To achieve this, the negative potential input of the first grid-side inverter thread 50 is coupled to the positive potential input of the second grid-side inverter thread 50' to form a neutral connection point for the centre connection line 62. The negative DC conductor 63 is electrically coupled to the negative input of the second grid-side inverter thread 50'.

A positive converter string 25A, representing the first converter string of this converter 3A is given by the first generator-side inverter thread 40 and the first grid-side inverter thread 50, both coupled to the center connection line as well as to the positive DC conductor. The positive converter string 25A is confined by a dashed line box in FIG. 5.

A negative converter string 24A, representing the second converter string of this converter 3A is given by the second generator-side inverter thread 40' and the second grid-side inverter thread 50', both coupled to the center connection line as well as to the negative DC conductor. The negative converter string 24A is also confined by a dashed line box in FIG. 5.

The positive converter string 25A is controlled by the generator-side string-operation controller 14 and grid-side string-operation controller 15 of the master-converter controller 13 that is associated with said positive converter string 25A. The negative converter string is controlled by the generator-side-string operation controller 14' and grid-side string-operation controller 15' of the slave-converter controller 12 that is associated with said negative converter string 24A.

Each of the generator-side 40, 40' and grid-side 50, 50' inverter threads is further equipped with energy dissipation elements 30, 30' and 31, 31', respectively. As can be seen from the circuitry diagram illustrated by FIG. 5, those energy dissipation elements are a series connection of a chopper switch and a resistor with high thermal capacity, wherein there are more energy dissipation elements on the grid-side than on the generator side. Therefore, a higher amount of active power can be dissipated on the grid-side than on the generator-side. The chopper switches comprised by the energy dissipation elements are also controlled by the corresponding string operation controllers 14, 14', 15, 15'.

The potential difference (voltage level) between the positive DC conductor 61 and the center connection line 62 can be measured by means of a first voltage sensor 28a, coupled to the positive DC conductor 61. The potential difference (voltage level) between the negative DC conductor 63 and the center connection line can be measured by means a second voltage sensor 28c, coupled to the negative DC conductor 63. The amount of current flowing along the centre line can be measured by means of a current sensor 28c, coupled to the centre connection line 62.

Figure 6:
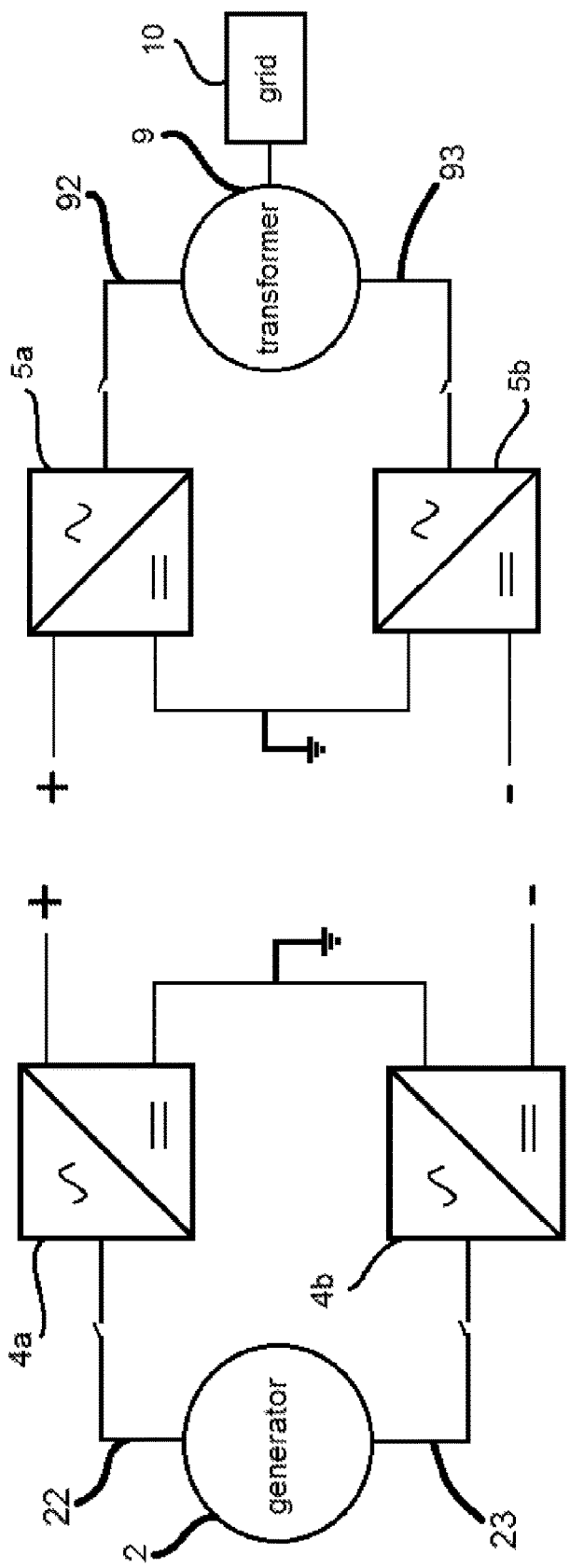
FIG. 6a illustrates a circuitry diagram with a series connection of generator-side string inverters.
FIG. 6b illustrates a circuitry diagram with a series connection of grid-side string inverters.

The circuitry diagram of FIG. 6a illustrates generator-side string inverters 4a, 4b coupled to respective separate generator windings 22, 23. These inverters 4a, 4b are rectifiers, with DC outputs connected in series as described in conjunction with FIG. 5.

The circuitry diagram of FIG. 6b illustrates grid-side string inverters 5a, 5b the AC output of which is coupled to corresponding separate transformer windings 92, 93. The DC inputs of the string inverters 5a, 5b are connected in series as described in conjunction with FIG. 5. The transformer 9 is connected to the electricity grid 10.

Figure 7:
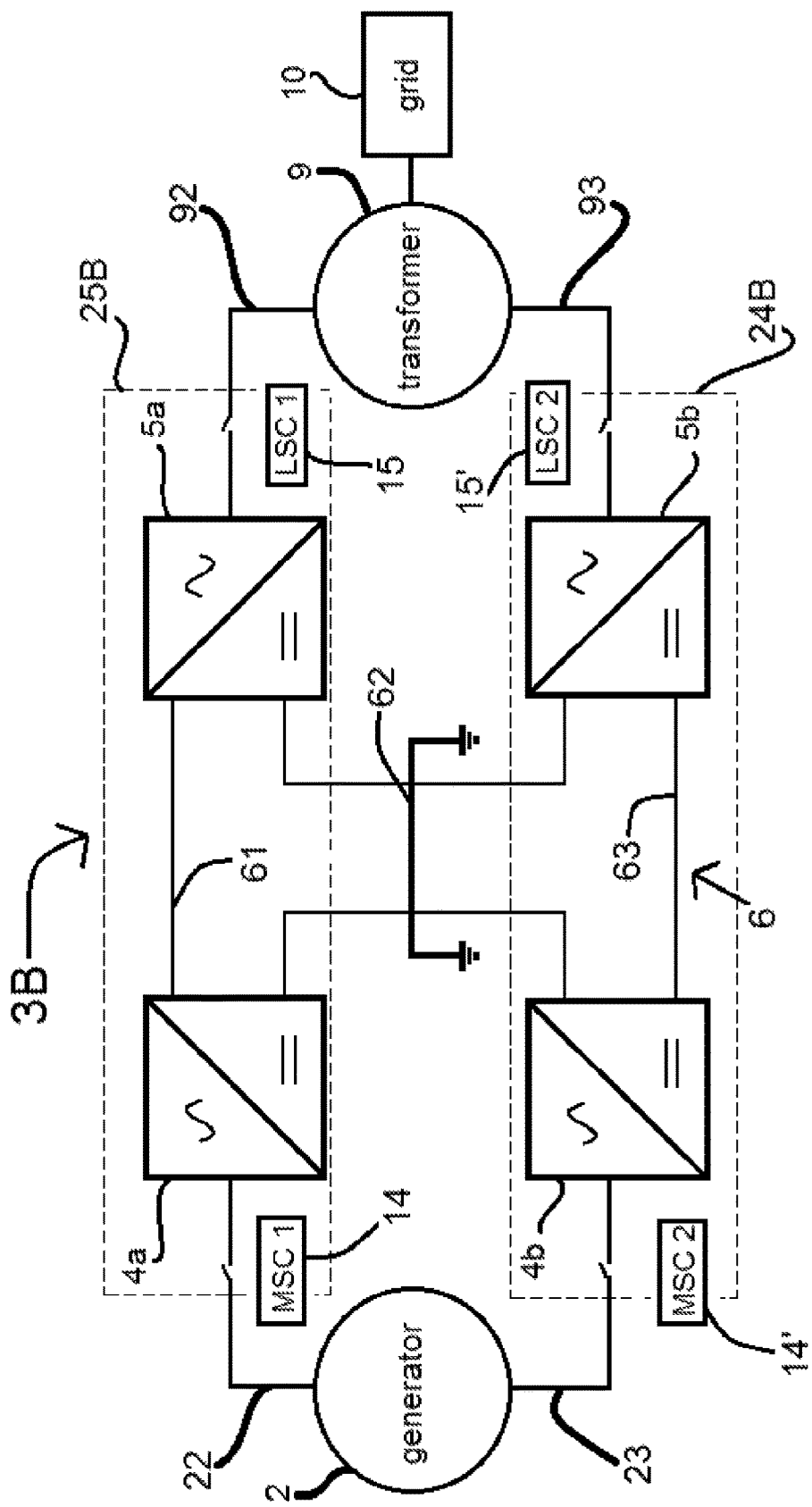
FIG. 7 illustrates a connection of the circuitry diagrams of FIG. 6a and FIG. 6b by a common DC link, thereby forming two converter strings that are coupled by this common DC link.

The circuitry diagram of FIG. 7 shows a back-to-back connection of the circuits of FIG. 6a and FIG. 6b, thereby establishing a common DC link between the series-connected generator-side inverters 4a and 4b and the series-connected grid-side inverters 5a and 5b. The circuitry represents another exemplary converter system 3B, with a first converter string 25 and a second converter string 26, marked by the dashed-line boxes of FIG. 7. The common DC link, representing the DC connection 6, is, as described in conjunction with FIG. 5, established by the centre connection line 62, the positive DC conductor 61 and the negative DC conductor 63, wherein the centre connection line couples the neutral connection point of the generator-side inverters 4a, 4b to the neutral connection point of the grid-side inverters 5a, 5b.

Figure 8:
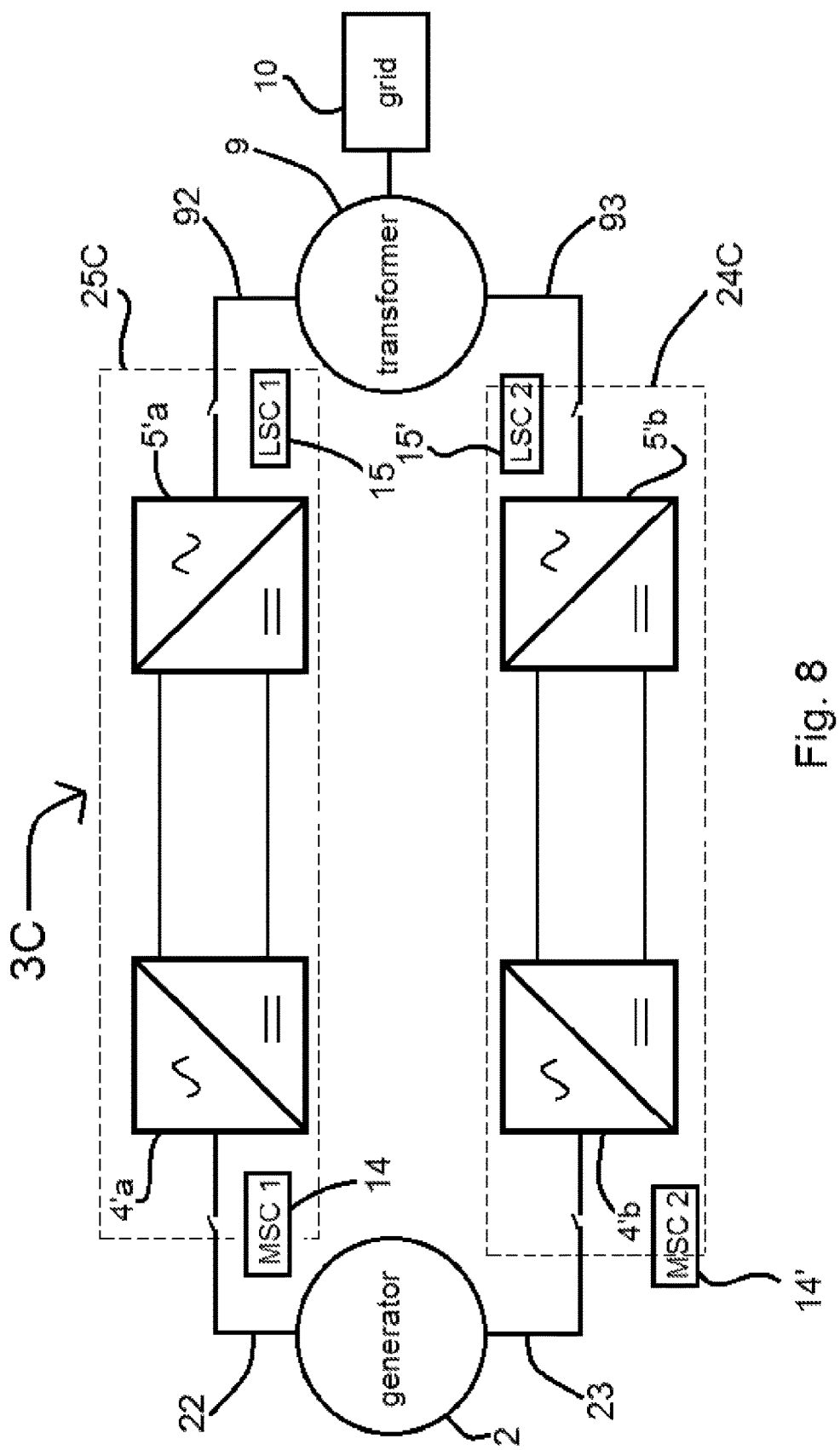
FIG. 8 illustrates a circuitry diagram with electrically separated converter strings.

An electronic circuitry diagram of a further exemplary converter system 3C shown in FIG. 8. In contrast to the exemplary converter systems of FIG. 5 and FIG. 7, this converter system does not have a common DC link, coupling the generator side string inverters 4'a, 4'b and the grid-side string inverters 5'a, 5'b. This converter system 3C rather has two separated and mutually insulated converter strings, namely a first converter string 25C and a second converter string 24C having separate DC links. The first converter string 25C is established by the generator-side string inverter 4'a coupled via a first DC link to the grid-side string inverter 5'a. This converter string connects a first set of separate generator windings 22 to a first set of separate transformer windings 92. The second converter string 24C is established by the generator-side string inverter 4'b coupled via a second DC link to the grid-side string inverter 5'b. This converter string connects a second set of separated generator windings 23 to a second set of separate transformer windings 93. The generator windings 23, 22 and the transformer windings 92, 93 are electrically insulated from each other.

The first converter string 25C is controlled by the generator-side string-operation controller 14 and grid-side string operation controller 15 of the master-converter controller 13 (not shown) that is associated with the first converter string 25C. The second converter string 24C is controlled by the generator-side string-operation controller 14' and grid-side string-operation controller 15' of the slave-converter controller 12 that is associated with the second converter string 24C.

Figure 9:
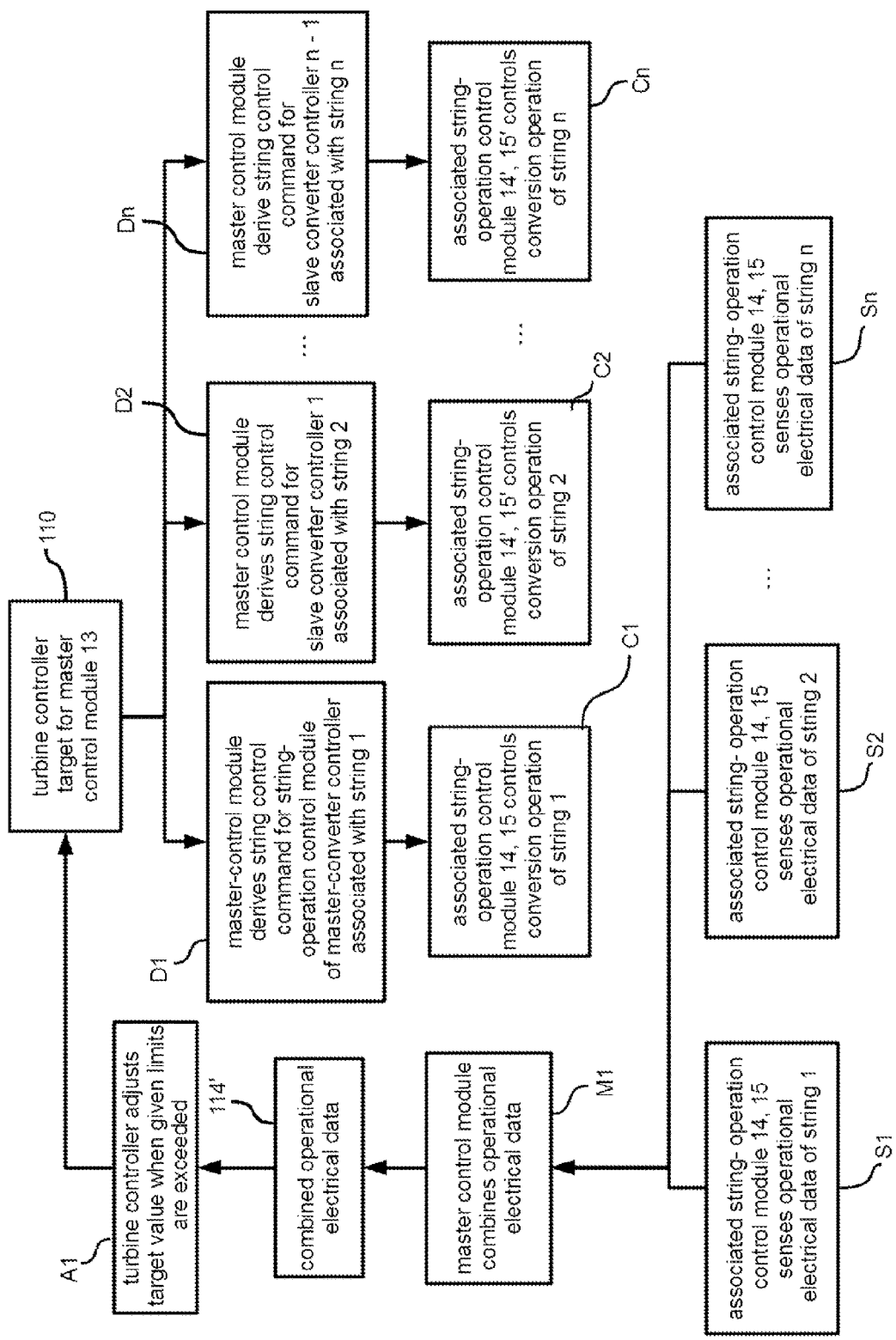
FIG. 9 illustrates a block diagram of a method of controlling the converter system, wherein the master-control module derives string control commands for the converter strings.

An exemplary method of controlling the wind turbine 50 by means of a converter controller 11, 11', 11" comprising the master-converter controller 13, 13' and the slave-converter controller 12, 12' mentioned above, wherein the master and slave-converter controller comprises at least one string-operation control module 14, 14', 15, 15' and the master-converter controller further comprises a master-control module 16 is illustrated by the block diagram of FIG. 9 in a high-level approach.

Turbine controller targets for the master-converter control module 110 are received by the master-control module 16. At box D1, the master-control module 16 derives string control commands 101 for the string-operation control module of the master-converter controller 13 that is associated with the first converter string 25, in the block diagram of FIG. 9 referred to as string 1. In the activities at box D2 to Dn, the master-control module derives string control commands for the slave-converter control modules 102 associated with the respective converter strings 2 to n.

In the activities at boxes C1 to Cn, the string-operation control modules associated with the respective converter strings 1 to n receive the corresponding string-operation-control commands from the master-control module 16 and control the conversion operation of the respective strings 1 to n accordingly. Hence the string-operation-control module of the master-converter controller 14, 15 follows the control commands derived by the master-control module 16 for the first converter string 25, associated with it. The string operation control modules of the slave converter controllers (in this example, one slave converter controller for each converter string 2 to n is provided) follow the control commands 102 derived for the converter strings, associated with them.

Furthermore, in the activities at boxes S1 to Sn, the string operation control modules associated with their respective string sense operational electrical data of their associated string. The operational electrical data of the respective strings is combined by the master-control module 16 at box M1, which results in combined operational electrical data of the converter strings 114'. This combined electrical data is transmitted to the turbine controller 21. The turbine controller 21 adjusts the target for the master-controller 100 at box A1, if, for example, given limits for the operational electrical data have been exceeded.

Figure 10:
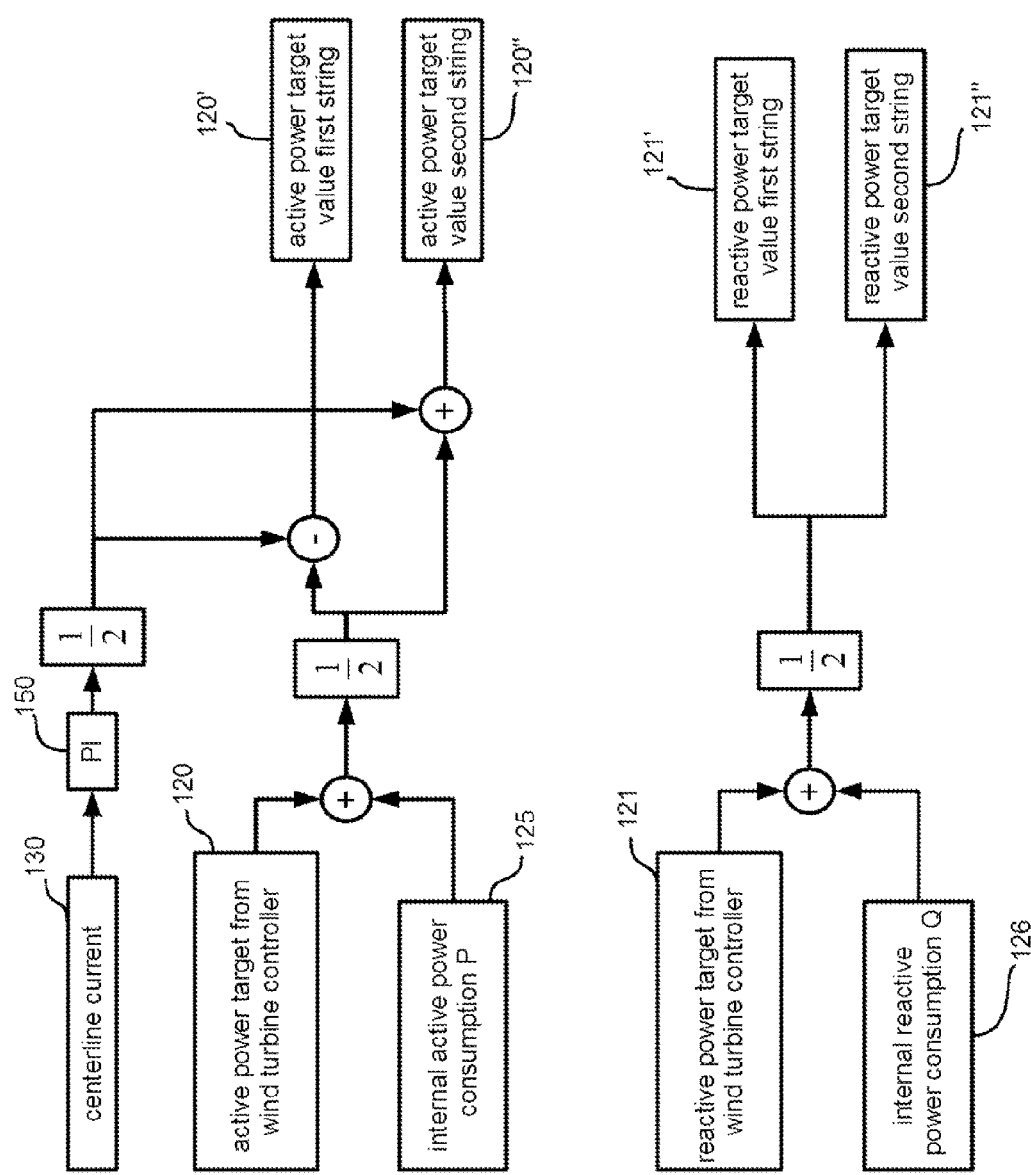
FIG. 10 illustrates a block diagram of a derivation of active power target and reactive power target values for the converter strings, related to a converter topology as illustrated by FIG. 5 or FIG. 7.

An exemplary derivation of active and reactive target values for the first and second converter strings 24, 25 of the converters 3A and 3B with a common DC link and a common centre connection line (illustrated by FIG. 5 and FIG. 7) is given by FIG. 10.

This exemplary derivation is carried out by the master-control module 16 upon receipt of turbine controller target values for active/reactive power 120, 121.

An internal active power consumption P 125 is added to the active power target value 120 received from the wind turbine controller. The result of this addition is divided by two. Hence, the active power target is in a first activity distributed equally among the converter strings. This reduces, per default, the current flowing in the centre line 62 of converters 3A, 3B, as already discussed in the "general description" part.

However, to compensate for the influence of unequal component quality in the first and second converter string, the centre line current 130 is continuously measured, for example by a current sensor 68 (shown in FIG. 5) and the active power targets for the first and second converter string 120', 120" are provided "unbalanced" on purpose in order to bring this centre line current 10 to a set point value, e.g. zero.

To achieve this, the equal active power targets for the two converter strings are adjusted by a proportional integral controller 150. The proportional integral controller for example calculates the difference between the centre line current at any given time and the set point. Then, the proportional integral controller, for example, derives the active power correction value corresponding to the deviation from the set point and divides that active power correction value by two. This correction value is subtracted from the active power target for the first string and added to the active power target—in order to unbalance the target values such that the centre line current reaches the setpoint value.

To derive the reactive power target values for the first and second converter string, the internal reactive power consumption Q 126 is added to the reactive power target from the wind turbine controller and the result of this addition is divided by two. Hence, the reactive power targets are distributed equally on the first and second converter string.

Figure 11:
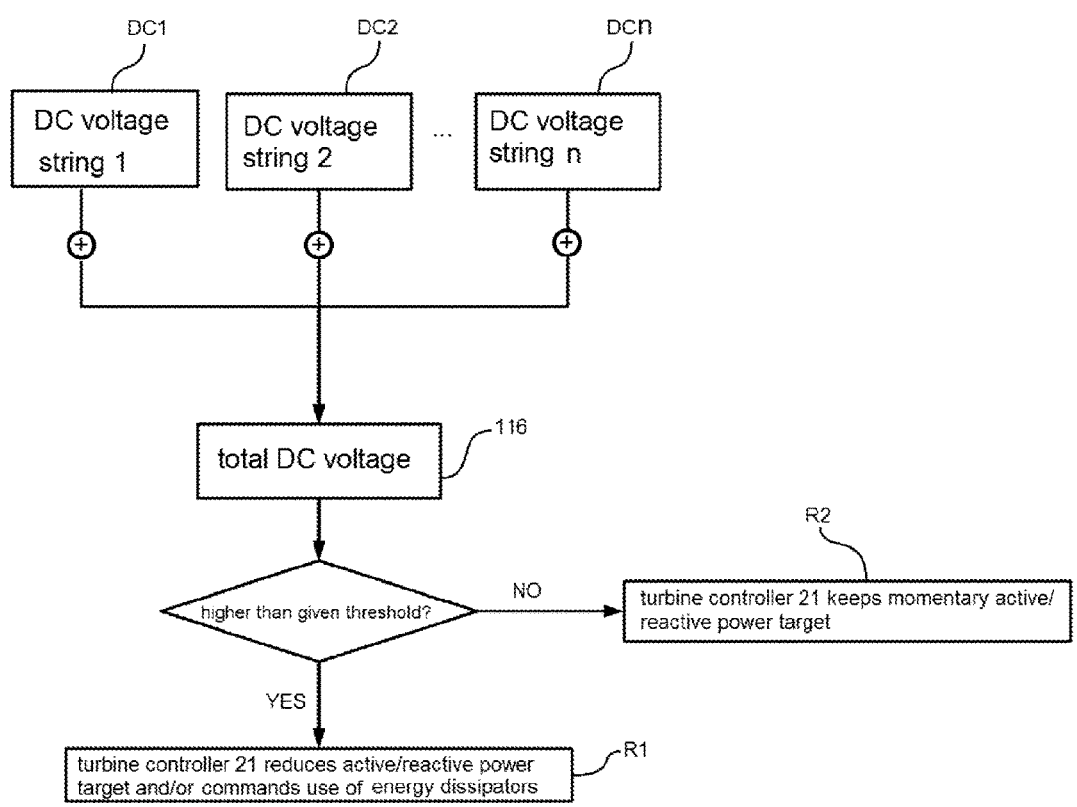
FIG. 11 illustrates a flow chart of the provision of operational electrical data to a wind turbine controller that adjusts the active/reactive power targets according to this data received.

In the block diagram of FIG. 11 operational electrical data, represented by the DC link voltage of the respective converter strings DC1 to DCn is combined by adding these voltage up to a total DC voltage 116 of the converter system. Subsequently, the total DC link voltage, representing the combined operational electrical data 115, is provided as an overall status report concerning DC voltage to the wind turbine controller 21. If the total DC voltage is higher than a given threshold, e.g. 1200 V in total, the turbine controller 21 reduces active/reactive power targets and/or commands the use of energy dissipators at box R1. Alternatively if the total DC voltage 116 is within a given range, i.e. does not exceed a given threshold, the turbine controller keeps its active/reactive power target at box R2.

The invention claimed is:

1. A wind turbine converter system arranged to convert variable-frequency electrical power produced by a variable-speed wind turbine into fixed-frequency electrical power to be fed into an electricity grid, wherein operation of the wind turbine is controlled by a wind turbine controller, the wind turbine converter system comprising:
   a converter comprising a first converter string and a second converter string; and;
   a converter controller comprising:
      a first converter string controller operated as a master controller, wherein the first converter string controller is configured to:
         receive superordinate control commands from the wind turbine controller;
         control conversion operation of the first converter string based on the superordinate control commands; and
         generate string control commands for a slave controller based on the superordinate control commands; and a second converter string controller operated as the slave controller, wherein the second converter string controller is configured to:
control conversion operation of the second converter string based on the string control commands.

2. The converter system of claim 1,
wherein the master controller comprises:
a master control module;
at least one string operation control module;
a first interface to the wind-turbine controller, wherein the master controller receives the superordinate control commands via the first interface; and
a second interface to the slave controller, wherein the master controller transmits the string control commands via the second interface, wherein the slave controller comprises:
at least one string operation control module; and
a third interface to the master controller, wherein the slave controller receives the string control commands via the third interface.

3. The converter system of claim 2, wherein the master control module and the at least one string operation control module of the master controller are integrated into a common controller unit providing an internal communication link for communicating string control commands from the master control module to the at least one string operation control module of the master controller.

4. The converter system of claim 1,
wherein each of the first converter string and the second converter string comprises:
one or more grid-side string inverters; and
one or more generator-side string inverters, and
wherein the at least one string operation control module of each of the master controller and the slave controller comprises:
a grid-side string operation control module configured to control conversion operation of the one or more grid-side string inverters;
a generator-side string operation control module configured to control conversion operation of the one or more generator-side string inverters.

5. The converter system of claim 4, wherein for the master controller one or more of the grid-side string operation control module and the generator-side string operation control module is integrated with the master control module into a common controller unit.

6. The converter system of claim 2, wherein the master control module is a first master control module, and
wherein the slave controller further comprises:
a second master control module configured to provide master control operation in place of the first master control module, upon failure of the master controller.

7. The converter system of claim 1,
wherein each of the first converter string and the second converter string comprises:
one or more grid-side string inverters; and
one or more generator-side string inverters,
wherein the one or more generator-side string inverters of the first converter string and of the second converter string are electrically connected in a first series connection, and
wherein the one or more grid-side string inverters of the first converter string and of the second converter string are electrically connected in a second series connection.

8. The converter system of claim 7, wherein the first series connection and the second series connection are connected back-to-back to form a common DC link.

9. The converter system of claim 8,
wherein the first series connection and the second series connection each form a respective neutral connection point, and
wherein the neutral connection points are connected to each other by a center connection line and are clamped to a neutral potential.

10. The converter system of claim 1, wherein the master controller is configured to:
receive, from the slave controller, first operational electrical data relating to the second converter string;
combine second operational electrical data relating to the first converter string with the first operational electrical data; and
provide the combined operational electrical data to the wind turbine controller.

11. The converter system of claim 1,
wherein the string control commands comprise one or both of an active power target and a reactive power target for the fixed-frequency electrical power to be fed into the electricity grid, and
wherein the first converter string controller and the second converter string controller are arranged to independently control the respective first converter string and the second converter string according to the one or both of the active power target and the reactive power target.

12. The converter system of claim 9, wherein the master controller is configured to:
measure a current in the center connection line; and
limit the current in the center connection line by at least one of:
adjusting one or both of an active power target and a reactive power target; and
stopping converter operation when the current is greater than a given limit.

13. The converter system of claim 1,
wherein each of the first converter string and the second converter string comprises at least one energy dissipator, and
wherein the first converter string controller and the second converter string controller are respectively arranged to control energy dissipation by the first converter string and the second converter string.

14. The converter system of claim 1, wherein the converter controller is arranged to provide a low-voltage ride-through function controlled individually for each of the first converter string and the second converter string.

15. A wind turbine comprising:
a nacelle mounted on a tower and housing a generator; and
a wind turbine converter system coupled with the generator, the wind turbine converter system comprising:
a converter comprising a first converter string and a second converter string; and
a converter controller comprising:
a first converter string controller operated as a master controller, wherein the first converter string controller is configured to:
receive superordinate control commands from the wind turbine controller;
control conversion operation of the first converter string based on the superordinate control commands; and generate string control commands for a slave controller based on the superordinate control commands; and a second converter string controller operated as the slave controller, wherein the second converter string controller is configured to:
control conversion operation of the second converter string based on the string control commands.

16. The wind turbine of claim 15,
wherein each of the first converter string and the second converter string comprises:
one or more generator-side string inverters that are arranged in the nacelle, and
one or more grid-side string inverters that are arranged at a lower part of the tower inside or outside the tower, and
wherein the one or more generator-side string inverters of the first converter string and of the second converter string and the one or more grid-side string inverters of the first converter string and of the second converter string are connected by a DC connection line along the tower.

17. A method of controlling a converter for converting variable-frequency electrical power produced by a variable-speed wind turbine into fixed-frequency electrical power to be fed into an electricity grid, wherein operation of the wind turbine is controlled by a wind turbine controller, the method comprising:
operating a first converter string controller as a master controller, wherein operating the first converter string controller comprises:
receiving superordinate control commands from the wind turbine controller;
controlling, based on the superordinate control commands, conversion operation of a first converter string of a plurality of converter strings; and
generating, based on the superordinate control commands, string control commands for a slave controller; and
operating a second converter string controller as the slave controller, wherein operating a second converter string controller comprises:
controlling, based on the string control commands, conversion operation of a second converter string of the plurality of converter strings.

* * * * *